(12) United States Patent
Tanaka et al.

(10) Patent No.: US 10,699,486 B2
(45) Date of Patent: Jun. 30, 2020

(54) DISPLAY SYSTEM, INFORMATION PRESENTATION SYSTEM, CONTROL METHOD OF DISPLAY SYSTEM, STORAGE MEDIUM, AND MOBILE BODY

(71) Applicant: Panasonic Intellectual Property Management Co., Ltd., Osaka (JP)

(72) Inventors: Akira Tanaka, Osaka (JP); Tadashi Shibata, Osaka (JP); Nobuyuki Nakano, Osaka (JP); Masanaga Tsuji, Osaka (JP); Shohei Hayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 16/016,695

(22) Filed: Jun. 25, 2018

(65) Prior Publication Data

US 2019/0005727 A1 Jan. 3, 2019

(30) Foreign Application Priority Data

Jun. 30, 2017 (JP) .................................. 2017-129897

(51) Int. Cl.
*G09G 5/00* (2006.01)
*G06T 19/00* (2011.01)
*G09G 3/02* (2006.01)
*G06K 9/00* (2006.01)

(52) U.S. Cl.
CPC ........ *G06T 19/006* (2013.01); *G06K 9/00362* (2013.01); *G06K 9/00671* (2013.01); *G06K 9/00798* (2013.01); *G06K 9/00805* (2013.01); *G06K 9/00818* (2013.01); *G09G 3/02* (2013.01); *G09G 2354/00* (2013.01); *G09G 2380/10* (2013.01)

(58) Field of Classification Search
CPC .............. G06T 19/006; G06K 9/00798; G06K 9/00818
See application file for complete search history.

(56) References Cited

U.S. PATENT DOCUMENTS

| | | | |
|---|---|---|---|
| 9,418,479 B1* | 8/2016 | Worley, III | G01B 11/2513 |
| 2002/0042676 A1* | 4/2002 | Furusho | G05D 1/0246 |
| | | | 701/300 |
| 2009/0160736 A1 | 6/2009 | Shikita | |
| 2011/0096093 A1* | 4/2011 | Oi | G06T 19/006 |
| | | | 345/633 |
| 2011/0254861 A1* | 10/2011 | Emura | G06F 3/0488 |
| | | | 345/633 |

(Continued)

FOREIGN PATENT DOCUMENTS

JP 2009-150947 7/2009

*Primary Examiner* — Charles Tseng
(74) *Attorney, Agent, or Firm* — Greenblum & Bernstein, P.L.C.

(57) ABSTRACT

A display system includes a projector that projects a virtual image onto a target space to allow a target person to visibly recognize the virtual image and a controller that controls display of the virtual image. When the projector projects a virtual image corresponding to a caution object, the controller selects at least one reference point from one or more candidate points existing around the caution object and associates the virtual image with the at least one reference point.

14 Claims, 15 Drawing Sheets

(56) References Cited

U.S. PATENT DOCUMENTS

| | | | |
|---|---|---|---|
| 2013/0034261 A1* | 2/2013 | Perlin | G06K 9/00818 382/100 |
| 2015/0035981 A1* | 2/2015 | Otsuki | G08G 1/09623 348/148 |
| 2017/0221272 A1* | 8/2017 | Li | G06T 19/006 |

* cited by examiner

DISPLAY SYSTEM, INFORMATION PRESENTATION SYSTEM, CONTROL METHOD OF DISPLAY SYSTEM, STORAGE MEDIUM, AND MOBILE BODY

TECHNICAL FIELD

The present disclosure generally relates to a display system, an information presentation system, a control method of a display system, a storage medium, and a mobile body, and particularly to a display system that projects a virtual image onto a target space, an information presentation system, a control method of a display system, a storage medium, and a mobile body.

BACKGROUND ART

As a display device (display system) for vehicle, there has been conventionally known a head-up display device for vehicle that displays in the distance a driving information image necessary for driving as a virtual image via a windshield (for example, see PTL 1).

The display device described in PTL 1 includes a screen on which an image is drawn. The image formed on the screen is reflected by the windshield of the vehicle via a projection means and comes into sight of a driver. Accordingly, the driver visually recognizes the virtual image in the distance ahead of the windshield.

CITATION LIST

Patent Literature

PTL 1: Unexamined Japanese Patent Publication No. 2009-150947

SUMMARY OF THE INVENTION

A display system according to an aspect of the present disclosure is a display system that projects an image onto a reflection member and superimposes the image reflected by the reflection member as a virtual image on a target space in front to allow a target person to visually recognize the image. The display system includes a projector and a controller. The projector projects the image. The controller controls display of the image. When the projector projects an image corresponding to a caution object, the controller selects at least one reference point from one or more candidate points existing around the caution object and associates the virtual image with the at least one reference point.

An information presentation system according to another aspect of the present disclosure includes a detection system that detects the caution object and the display system.

A control method of a display system according to still another aspect of the present disclosure is a control method of a display system including a projector that projects an image onto a reflection member and superimposes the image reflected by the reflection member as a virtual image on a target space in front to allow a target person to visually recognize the image, and a controller that controls display of the image. In the control method of the display system, when the projector projects an image corresponding to a caution object, at least one reference point is selected from one or more candidate points existing around the caution object and the virtual image is associated with the at least one reference point.

A program according to still another aspect of the present disclosure is a non-transitory recording medium describing a program for causing a computer to execute the control method of the display system.

A mobile body according to an aspect of the present disclosure includes the display system and the reflection member that has light permeability and reflects light emitted from the projector to allow the target person to visually recognize the virtual image.

According to the present disclosure, it is easy to recognize which caution object corresponds to the virtual image which is displayed.

DESCRIPTION OF EMBODIMENT

Prior to describing an exemplary embodiment of the present disclosure, problems with a conventional device will be briefly described. There exist caution objects such as persons, vehicles, right-turn points, left-turn points, and others in a projection direction of a virtual image (ahead of a mobile body). According to the display device (display system) described in PTL 1, when a virtual image corresponding to a caution object is projected, it is difficult for a target person to recognize which caution object corresponds to the virtual image which is displayed unless the target person can have a sense of distance to the virtual image.

The present disclosure is devised in light of the foregoing circumstances. An object of the present disclosure is to provide a display system that makes it easy to recognize which caution object corresponds to a virtual image which is displayed, an information presentation system, a control method of a display system, a program, and a mobile body.

An exemplary embodiment and modification examples described below are mere examples of the present disclosure and the present disclosure is not limited to the exemplary embodiment and modification examples. Besides the exemplary embodiment and modification examples, the present disclosure can be modified in various manners in accordance with design and the like without deviating from the technical idea of the present disclosure.

EXEMPLARY EMBODIMENT (1) Outline

Figure 1:
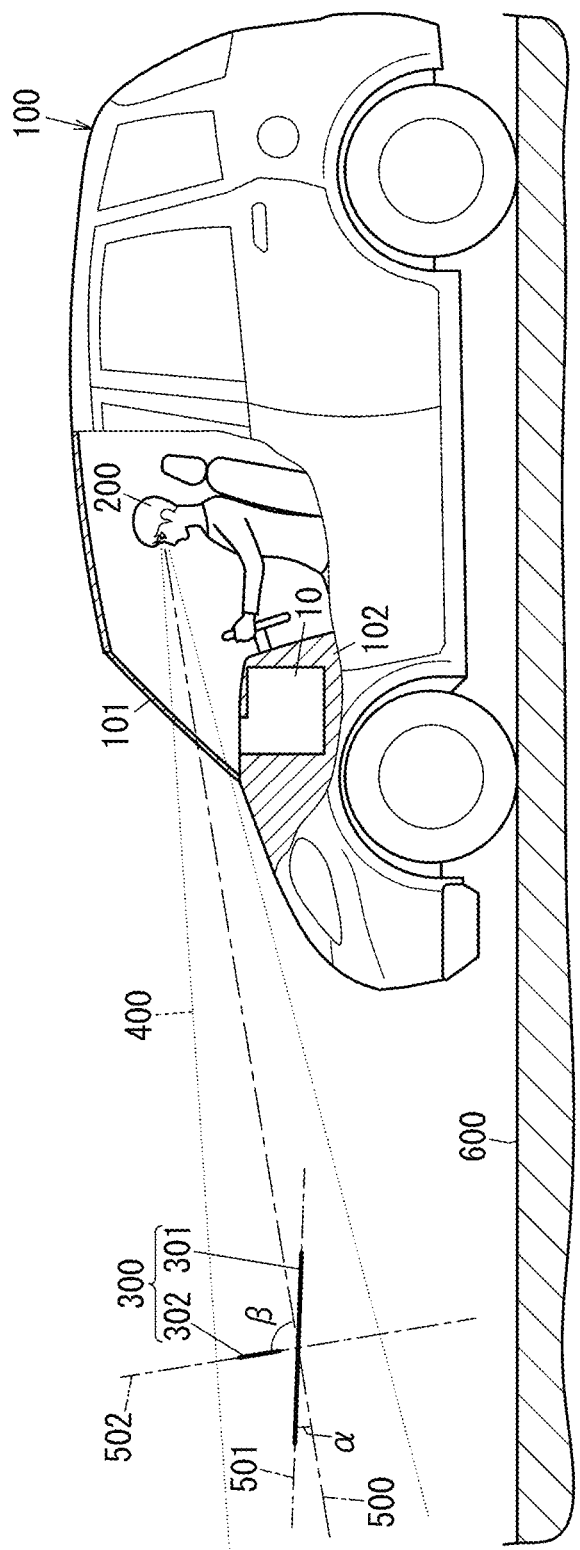
FIG. 1 is a conceptual diagram of a vehicle including a display system according to an exemplary embodiment.

As shown in FIG. 1, display system 10 according to the exemplary embodiment is a head-up display (HUD) for use in vehicle 100 as a mobile body, for example.

Display system 10 is installed in a cabin of vehicle 100 to project an image onto windshield 101 of vehicle 100 from below. In an example of FIG. 1, display system 10 is disposed in dashboard 102 installed below windshield 101. When an image is projected from display system 10 onto windshield 101, user 200 (driver) visually recognizes the image reflected by windshield 101 as a reflection member.

According to display system 10, user 200 visually recognizes virtual image 300 projected onto target space 400 set ahead of vehicle 100 (outside of the vehicle) through windshield 101. The "virtual image" mentioned herein means an image appearing as if an object were actually present, which is formed by a ray of light emitted from display system 10 and radiated by a reflector such as windshield 101. Since windshield 101 has light permeability, user 200 as a target person can see target space 400 ahead of vehicle 100 through windshield 101. Therefore, user 200 can see virtual image 300 that is projected by display system 10 and superimposed on a real space ahead of vehicle 100. Therefore, display system 10 can display various pieces of driving assistance information such as vehicle speed information, navigation information, pedestrian information, forward vehicle information, lane departure information, and vehicle condition information as virtual image 300, so that user 200 can visually recognize the various pieces of driving assistance information. Accordingly, user 200 can acquire visually the driving assistance information only by moving slightly the line of sight directed to the area ahead of windshield 101.

In display system 10 according to this exemplary embodiment, virtual image 300 formed in target space 400 includes at least two types of virtual images, which are first virtual image 301 and second virtual image 302. The "first virtual image" mentioned herein is virtual image 300 (301) formed on first virtual plane 501. The "first virtual plane" is a virtual plane in which inclination angle $\alpha$ with respect to optical axis 500 of display system 10 is smaller than predetermined value $\gamma$ ($\alpha<\gamma$). The "second virtual image" mentioned herein is virtual image 300 (302) formed on second virtual plane 502. The "second virtual plane" is a virtual plane in which inclination angle $\beta$ with respect to optical axis 500 of display system 10 is larger than predetermined value $\gamma$ ($\beta>\gamma$). The "optical axis" mentioned herein is an optical axis of an optical system of projection optical system 4 (see FIG. 3) described later. The "optical axis" means an axis that passes through a center of target space 400 along an optical path of virtual image 300. An example of predetermined value $\gamma$ is 45 degrees, and an example of inclination angle $\beta$ is 90 degrees.

In display system 10 according to this exemplary embodiment, virtual image 300 formed in target space 400 includes third virtual image 303 (see FIG. 2) in addition to first virtual image 301 and second virtual image 302. The "third virtual image" mentioned herein is, similarly to second virtual image 302, virtual image 300 (303) formed on second virtual plane 502 in which inclination angle $\beta$ with respect to optical axis 500 is larger than predetermined value $\gamma$. Although described later in detail, in virtual image 300 formed on second virtual plane 502, second virtual image 302 is formed by light penetrating movable screen 1a and third virtual image 303 is formed by light penetrating fixed screen 1b.

In this exemplary embodiment, optical axis 500 extends along road surface 600 ahead of vehicle 100 in target space 400 ahead of vehicle 100. First virtual image 301 is formed on first virtual plane 501 substantially parallel to road surface 600, and second virtual image 302 and third virtual image 303 are formed on second virtual plane 502 substantially perpendicular to road surface 600. For example, when road surface 600 is a horizontal plane, first virtual image 301 is displayed along the horizontal plane, and second virtual image 302 and third virtual image 303 are displayed along a vertical plane.

Figure 2:
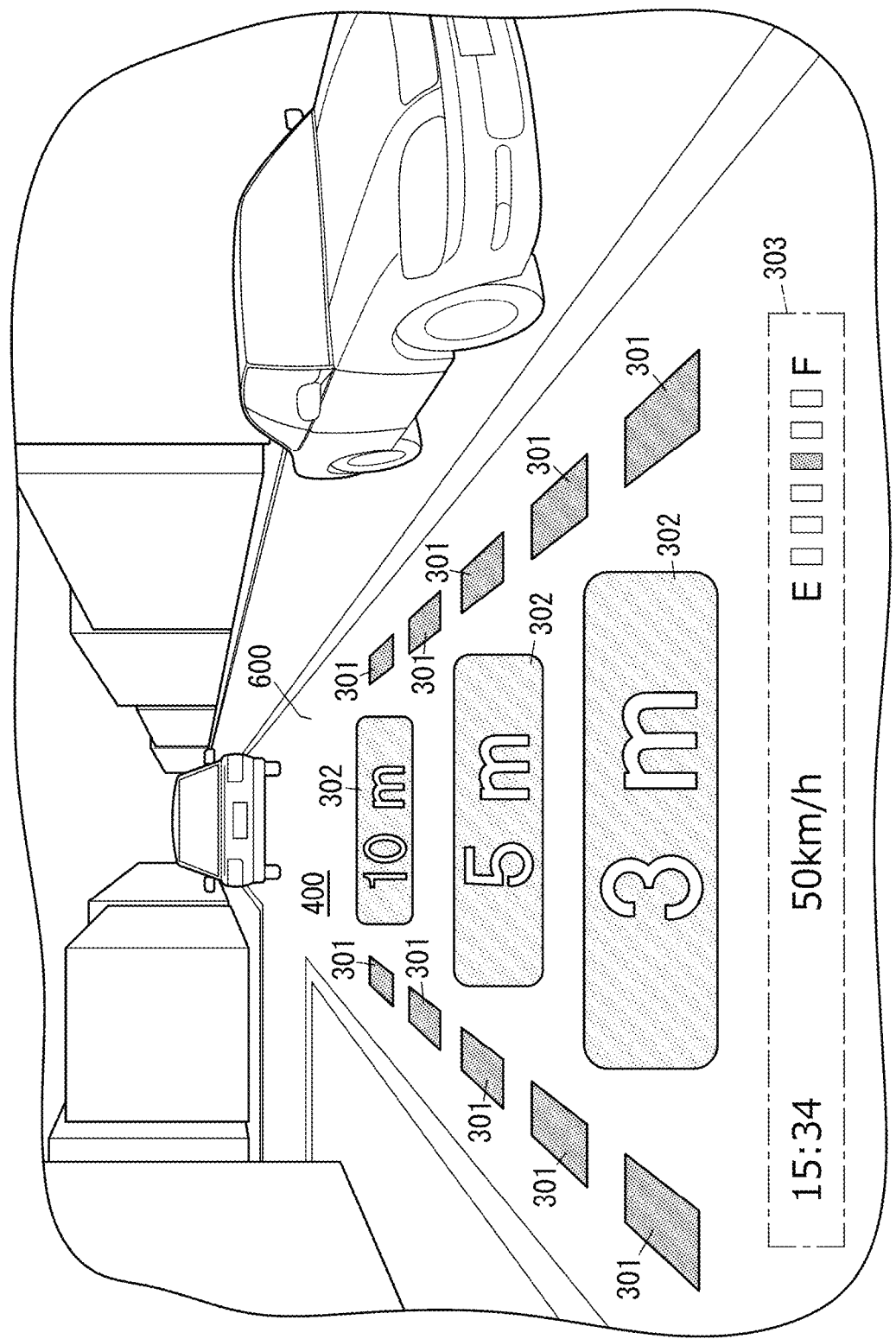
FIG. 2 is a conceptual diagram illustrating a visual field of a user using the display system.

FIG. 2 is a conceptual diagram illustrating a visual field of user 200. As illustrated in FIG. 2, display system 10 according to this exemplary embodiment is capable of displaying first virtual image 301 visually recognized at a depth along road surface 600 and second virtual image 302 and third virtual image 303 visually recognized as being upright on road surface 600 at a specific distance from user 200. Therefore, in the eyes of user 200, first virtual image 301 looks like being present on a plane substantially parallel to road surface 600, and second virtual image 302 and third virtual image 303 look like being present on a plane substantially perpendicular to road surface 600. An example of first virtual image 301 is navigation information indicating a traveling direction of vehicle 100, and can present an arrow indicating a right turn or a left turn on road surface 600. An example of second virtual image 302 is information indicating a distance to a forward vehicle or a pedestrian, and can present the distance to the forward vehicle (vehicle-to-vehicle distance) on the forward vehicle. An example of third virtual image 303 is information indicating a current time, vehicle speed, and vehicle condition and can present the information by characters, numbers, and symbols, or a meter such as a fuel gauge, for example.

Figure 3:
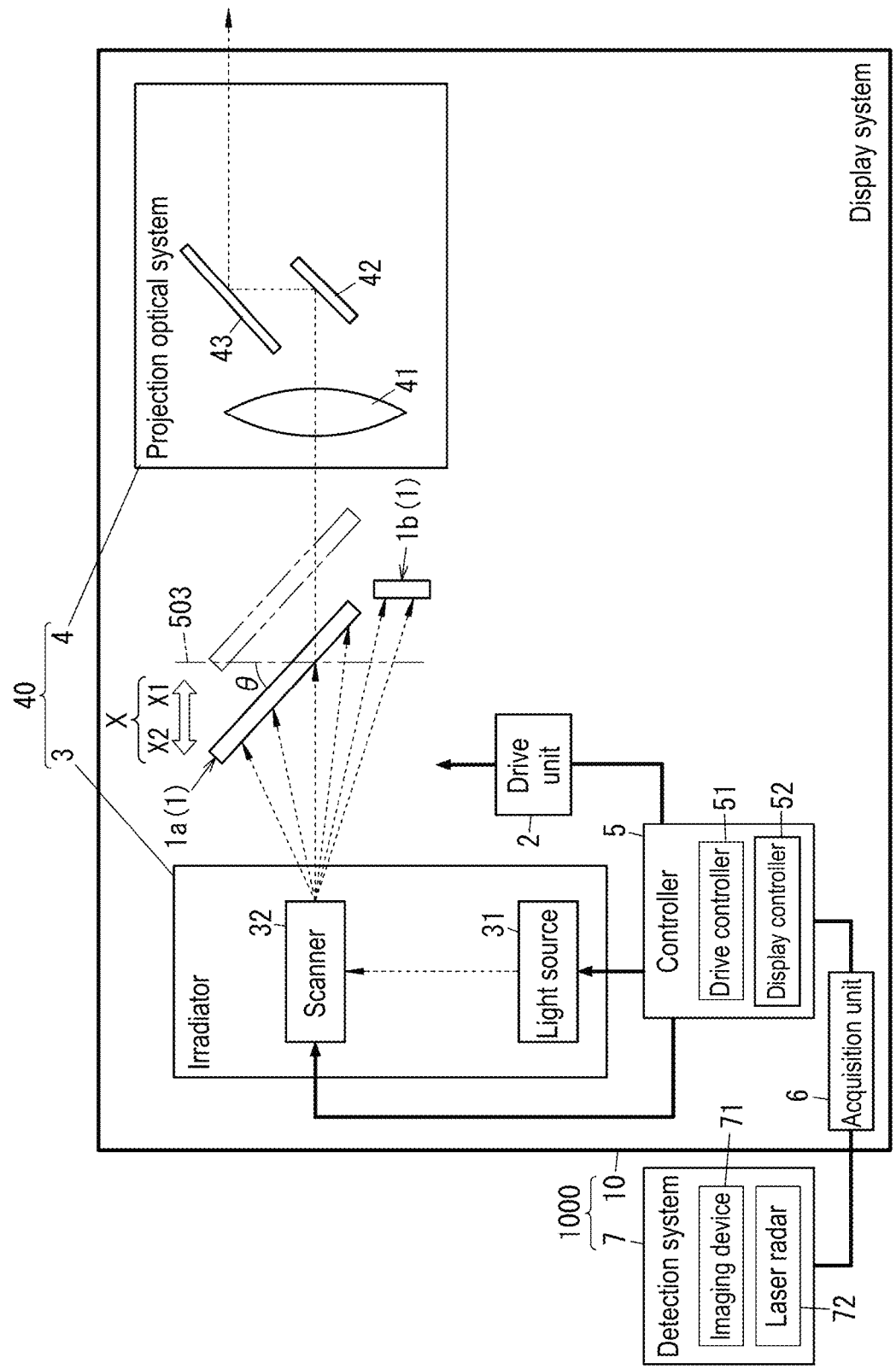
FIG. 3 is a conceptual diagram illustrating a configuration of the display system.

As illustrated in FIG. 3, display system 10 constitutes information presentation system 1000 in combination with detection system 7. Detection system 7 includes imaging device 71 and laser radar 72, for example, as illustrated in FIG. 3.

Imaging device 71 has a camera and is provided to capture an image in the projection direction of virtual image 300. Laser radar 72 is provided to detect an object existing in the projection direction of virtual image 300. The projection direction mentioned herein is a direction in which user 200 sees virtual image 300.

Based on the image captured by imaging device 71 and results of detection by laser radar 72, detection system 7 detects whether any shielding object such as a vehicle or a person exists in the projection direction. When there exists any shielding object, detection system 7 determines a distance from vehicle 100 to the shielding object based on the results of detection by laser radar 72. Specifically, laser radar 72 irradiates target space 400 with pulsed laser light and receives reflection light reflected by the object in the target space. Laser radar 72 calculates a distance to the object based on the time from emission of the laser light to reception of the reflection light.

Detection system 7 also uses a learning model generated by a mechanical learning algorithm, for example, to recognize the shielding object existing in the target space from the image captured by imaging device 71.

Detection system 7 provides display system 10 with detection result information including the results of detection on the presence or absence of an object and, if any, the distance to the object.

Detection system 7 also determines the present position of vehicle 100 using global positioning system (GPS) and acquires map information regarding the surroundings of the present position of vehicle 100 based on the present position. Detection system 7 may acquire the map information regarding the surroundings of the present position of vehicle 100 from a memory storing in advance the map information, or may acquire the map information regarding the surroundings of the present position of vehicle 100 via communications with an external server. Position information mentioned herein is road information at the present position of vehicle 100, for example, including the number of lanes, road width, the presence or absence of a sidewalk, up grade/down grade, the curvature of a curve.

Detection system 7 also acquires vehicle information indicating the conditions of vehicle 100 from Advanced Driver Assistance System (ADAS) or the like. The vehicle information includes, for example, the running speed (vehicle speed), acceleration, accelerator position, the degree of depression of the brake pedal of vehicle 100. Imaging device 71 and laser radar 72 may be used in combination with the ADAS.

(2) Configuration

According to the exemplary embodiment, as shown in FIG. 3, display system 10 includes a plurality of screens 1a, 1b, drive unit 2, irradiator 3, projection optical system 4, controller 5, and acquisition unit 6. According to the exemplary embodiment, projection optical system 4 constitutes projector 40 that projects virtual image 300 (see FIG. 1) onto target space 400 (see FIG. 1) together with irradiator 3.

Plurality of screens 1a, 1b include fixed screen 1b and movable screen 1a. Fixed screen 1b is fixed at a predetermined position with respect to a housing and the like of display system 10. Movable screen 1a is inclined at angle θ with respect to reference plane 503. Movable screen 1a is configured to be movable in movement direction X perpendicular to reference plane 503. The "reference plane" mentioned herein is not an actual surface but a virtual plane which prescribes the movement direction of movable screen 1a. Movable screen 1a is configured to be movable rectilinearly in movement direction X (direction shown by arrow X1-X2 in FIG. 3) while maintaining an orientation of inclination at angle θ with respect to reference plane 503. In the following description, each of the plurality of screens 1a, 1b may be called "screen 1" when movable screen 1a and fixed screen 1b are not particularly differentiated from each other.

Screen 1 (movable screen 1a and fixed screen 1b) has light permeability and forms an image to form virtual image 300 (see FIG. 1) in target space 400 (see FIG. 1). Specifically, the image is drawn by the light from irradiator 3 on screen 1, and virtual image 300 is formed in target space 400 by the light penetrating screen 1. Screen 1 is formed of a rectangular plate-shaped member with light-diffusing property, for example. Screen 1 is disposed between irradiator 3 and projection optical system 4.

Drive unit 2 moves movable screen 1a in movement direction X. Drive unit 2 can move movable screen 1a in both a direction toward projection optical system 4 and a direction away from projection optical system 4 along movement direction X. For example, drive unit 2 is an electric-driven actuator such as a voice coil motor, and operates according to a first control signal from controller 5.

Irradiator 3 is a scanning light irradiator that irradiates movable screen 1a or fixed screen 1b with light. Irradiator 3 includes light source 31 and scanner 32. In irradiator 3, each of light source 31 and scanner 32 operates according to a second control signal from controller 5.

Light source 31 is a laser module that outputs laser light. Light source 31 includes a red laser diode that outputs a laser light beam of red color (R), a green laser diode that outputs a laser light beam of green color (G), and a blue laser diode that outputs a laser light beam of blue color (B). The three color laser light beams output from these three kinds of laser diodes are composited by a dichroic mirror, for example, and are entered into scanner 32.

Scanner 32 irradiates movable screen 1a or fixed screen 1b with light from light source 31 to scan one side of movable screen 1a or fixed screen 1b. In this example, scanner 32 performs raster scan in which one side of movable screen 1a or fixed screen 1b is two-dimensionally scanned with light.

When the light output from irradiator 3 penetrates screen 1 and enters projection optical system 4 as incident light. Projection optical system 4 projects virtual image 300 (see FIG. 1) by the incident light onto target space 400 (see FIG. 1). Projection optical system 4 is arranged in line with screen 1 in movement direction X of movable screen 1a. As illustrated in FIG. 3, projection optical system 4 includes magnifying lens 41, first mirror 42, and second mirror 43.

Magnifying lens 41, first mirror 42, and second mirror 43 are arranged in this order on a route of light penetrating screen 1. Magnifying lens 41 is disposed on the opposite side to irradiator 3 (first direction X1 side) in movement direction X as seen from screen 1 so that light output from screen 1 in movement direction X enters magnifying lens 41. Magnifying lens 41 magnifies an image formed on screen 1 by the light from irradiator 3 and output the image to first mirror 42. First mirror 42 reflects the light from magnifying lens 41 toward second mirror 43. Second mirror 43 reflects the light from first mirror 42 toward windshield 101 (see FIG. 1). That is, projection optical system 4 magnifies the image formed on screen 1 by the light from irradiator 3 with magnifying lens 41 and projects the image onto windshield 101, thereby projecting virtual image 300 onto target space 400. An optical axis of magnifying lens 41 corresponds to optical axis 500 of projection optical system 4.

Controller 5 is a microcomputer mainly including a central processing unit (CPU) and a memory, for example. In other words, controller 5 is implemented by a computer including a CPU and a memory. The CPU executes a program stored in the memory, thereby allowing the computer to function as controller 5. In this example, the program is recorded in advance in the memory of controller 5. Alternatively, the program may be provided via a telecommunication line such as the Internet or by being recorded in a (non-transitory) recording medium such as a memory card.

Controller 5 controls projection (display) by projector 40 by controlling drive unit 2 and irradiator 3. Controller 5 controls drive unit 2 by the first control signal and controls irradiator 3 by the second control signal. Controller 5 is configured to synchronize operations of drive unit 2 with operations of irradiator 3. Controller 5 further has functions of drive controller 51 and display controller 52 as illustrated in FIG. 3.

Drive controller 51 controls drive unit 2 to move movable screen 1a relative to a reference position. The "reference position" mentioned herein is set to a prescribed position in a movement area of movable screen 1a. Drive controller 51 moves movable screen 1a to project second virtual image 302 onto target space 400 by light penetrating movable screen 1a. Drive controller 51 controls drive unit 2 in synchronization with drawing an image on movable screen 1a by irradiator 3.

Display controller 52 determines the contents of virtual image 300 to be displayed and the display position of virtual image 300 based on one or more pieces of information acquired by acquisition unit 6. Specifically, when there exists a caution object to be aware of by user 200, display controller 52 determines virtual image 300 to be displayed for attracting the attention of user 200 and the display position of virtual image 300, based on one or more pieces of information acquired by acquisition unit 6. For example, when the results of detection by detection system 7 indicates that there exists a caution object in the projection direction of virtual image 300, display controller 52 selects a reference point from one or more candidate points existing around the caution object and associates virtual image 300 with the reference point. Display controller 52 causes drive controller 51 to display (project) the virtual image with the reference point as a starting point. Since virtual image 300 is displayed with the reference point as a starting point out of one or more candidate points existing around the caution object, user 200 can easily recognize which caution object corresponds to virtual image 300 which is displayed. The caution object mentioned herein includes objects (persons or other vehicles) existing ahead of vehicle 100, the position where vehicle 100 needs to turn right or left, and others.

Acquisition unit 6 acquires from detection system 7 information on the object existing around vehicle 100. Specifically, acquisition unit 6 acquires the detection result information from detection system 7. Acquisition unit 6 also acquires the map information, the vehicle information, the position information, the information on navigation to vehicle 100 (navigation information), and others.

(3) Operations (3.1) Basic Operations

Basic operations of display system 10 in the exemplary embodiment will be described below. Controller 5 controls irradiator 3 to irradiate movable screen 1a with light from irradiator 3. In this instance, irradiator 3 irradiates movable screen 1a with light for scanning one side of movable screen 1a. Accordingly, an image is formed (projected) on movable screen 1a. The light from irradiator 3 penetrates movable screen 1a and is directed from projection optical system 4 to windshield 101. In this way, the image formed on movable screen 1a is projected onto windshield 101 from below windshield 101 in the cabin of vehicle 100.

When the image is projected from projection optical system 4 onto windshield 101, windshield 101 reflects the light from projection optical system 4 toward user 200 (driver) in the cabin. This allows user 200 to visually recognize the image reflected by windshield 101. As a result, user 200 can visually recognize virtual image 300 (first virtual image 301 or second virtual image 302) projected onto the area ahead of (outside) vehicle 100 through windshield 101.

Specifically, while movable screen 1a is fixed, controller 5 scans one side of movable screen 1a with light in movement direction X to form first virtual image 301 visually recognized at a depth along road surface 600. Controller 5 scans one side of movable screen 1a with light while moving movable screen 1a such that the distance from a luminous point on one side of movable screen 1a to projection optical system 4 is kept constant in X direction. As a result, second virtual image 302 visually recognized as being upright on road surface 600 at a certain distance from user 200 is formed.

While movable screen 1a is irradiated with the light from irradiator 3, controller 5 controls drive unit 2 by drive controller 51 to move movable screen 1a in movement direction X. In a case where the position on one side of movable screen 1a irradiated with the light from irradiator 3, that is, the position of the luminous point is constant, when movable screen 1a moves in first direction X1, the distance from the eyes (eye point) of user 200 to virtual image 300 (referred to as also "visual distance") becomes shorter. In contrast, in a case where the position of the luminous point on one side of movable screen 1a is constant, when movable screen 1a moves in second direction X2, the visual distance to virtual image 300 becomes longer (more distant). That is, the visual distance to virtual image 300 changes according to the position of movable screen 1a in movement direction X.

For example, to change the visual distance to first virtual image 301, controller 5 moves movable screen 1a in X direction according to the visual distance, fixes movable screen 1a in the position after movement, and scans one side of movable screen 1a with light. To change the visual distance to second virtual image 302, controller 5 moves movable screen 1a in X direction according to the visual distance. Controller 5 scans one side of movable screen 1*a* with light while moving movable screen 1*a* such that the distance from the luminous point to projection optical system 4 is constant in X direction with the position after movement as a reference.

Controller 5 also controls irradiator 3 to irradiate fixed screen 1*b* with light from irradiator 3. In this instance, irradiator 3 irradiates fixed screen 1*b* with light for scanning one side of fixed screen 1*b*. Therefore, as in a case of irradiating movable screen 1*a* with light, an image is formed (projected) on fixed screen 1*b*, and the image is projected onto windshield 101. As a result, user 200 can visually recognize virtual image 300 (third virtual image 303) projected onto the area ahead of (outside) vehicle 100 through windshield 101. Since third virtual image 303 is formed from the light projected onto fixed screen 1*b* in a fixed position, third virtual image 303 is visually recognized by user 200 as being upright on road surface 600 at a predetermined distance (for example, 2 m to 3 m) from user 200.

Display system 10 of the exemplary embodiment can project all first virtual image 301, second virtual image 302, and third virtual image 303 in one cycle during which scanner 32 reciprocates once in a vertical direction of movable screen 1*a* (the direction inclined to reference plane 503 of movable screen 1*a*). Specifically, in the "first scanning motion" where movable screen 1*a*, fixed screen 1*b* are scanned with light in this order, projector 40 first irradiates movable screen 1*a* with light to project first virtual image 301, and then irradiates fixed screen 1*b* with light to display third virtual image 303. Then, in the "second scanning motion" where fixed screen 1*b*, movable screen 1*a* are scanned with light in this order, projector 40 first irradiates fixed screen 1*b* with light to display third virtual image 303 and then irradiates movable screen 1*a* with light to project second virtual image 302.

Therefore, in one cycle during which scanner 32 performs vertical scanning, first virtual image 301, third virtual image 303, and second virtual image 302 are projected onto target space 400. Since irradiator 3 performs vertical scanning at a relatively high speed, user 200 visually recognizes first virtual image 301, third virtual image 303, and second virtual image 302 as if they are displayed simultaneously. The frequency of vertical scanning by irradiator 3 is 60 Hz or more, for example.

(3.2) Operations of Display System

Figure 4:
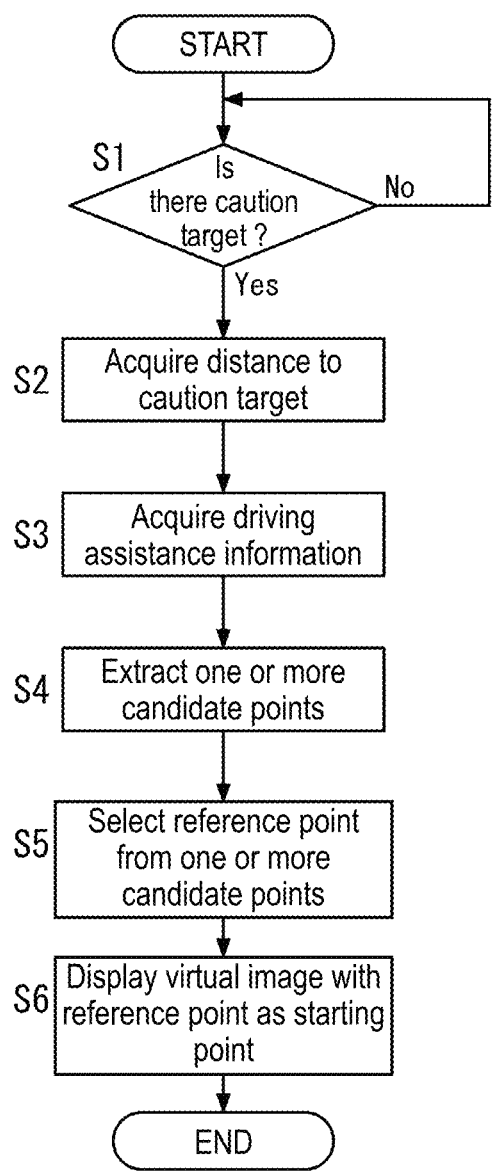
FIG. 4 is a flowchart for describing operations of the display system.

Next, operations of display system 10 in the exemplary embodiment will be described with reference to the flowchart of FIG. 4.

Display controller 52 determines whether there exists a caution object in the projection direction of virtual image 300 (ahead of user 200) based on the results of detection by detection system 7 (step S1).

When determining that there exists no caution object (No in step S1), display controller 52 repeats the determination process (step S1).

When determining that there exists a caution object (Yes in step S1), display controller 52 acquires the distance to the caution object determined by detection system 7 (step S2). Specifically, display controller 52 acquires the distance from vehicle 100 to the caution object in the projection direction in which virtual image 300 is projected.

Display controller 52 acquires the driving assistance information including information on the surroundings of the vehicle (ahead of the vehicle) (step S3).

Display controller 52 extracts one or more candidate points based on the image captured by imaging device 71 and the driving assistance information (step S4). Specifically, display controller 52 specifies an object (for example, a sign or a white line) existing around the caution object which is acquired from the image and the driving assistance information, and extracts the specified object or part of it as one or more candidate points.

Display controller 52 selects at least one reference point from the one or more candidate points which are extracted (step S5). For example, out of the one or more candidate points, display controller 52 selects a candidate point that does not overlap the caution object when virtual image 300 is displayed with the candidate point as a starting point and is closest to the caution object, as a reference point.

Display controller 52 causes drive controller 51 to display (project) virtual image 300 with the reference point as a starting point. Drive controller 51 displays virtual image 300 according to the caution object with the reference point as a starting point (step S6).

Figure 5A:
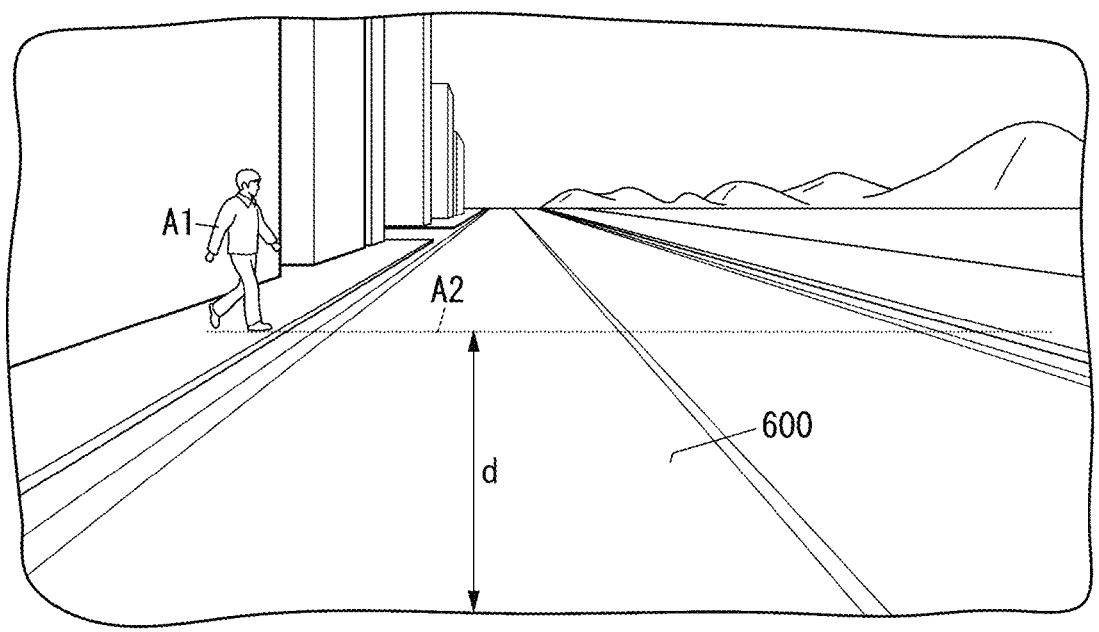
FIG. 5A is a conceptual diagram describing a specific example of operations of the display system.
Figure 5B:
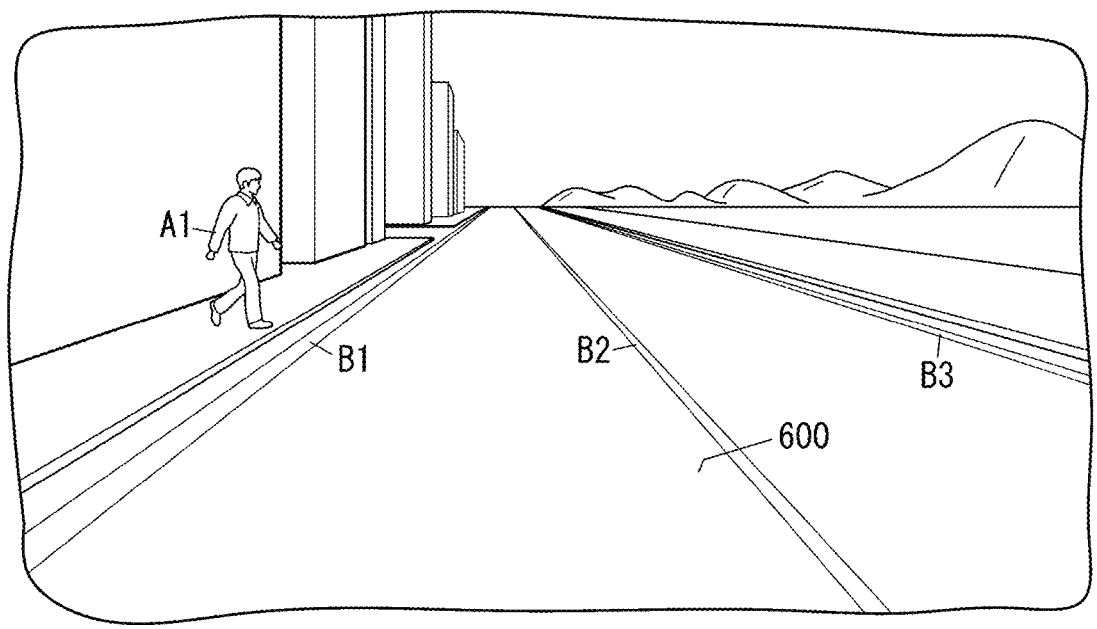
FIG. 5B is a conceptual diagram describing a specific example of operations of the display system.
Figure 6A:
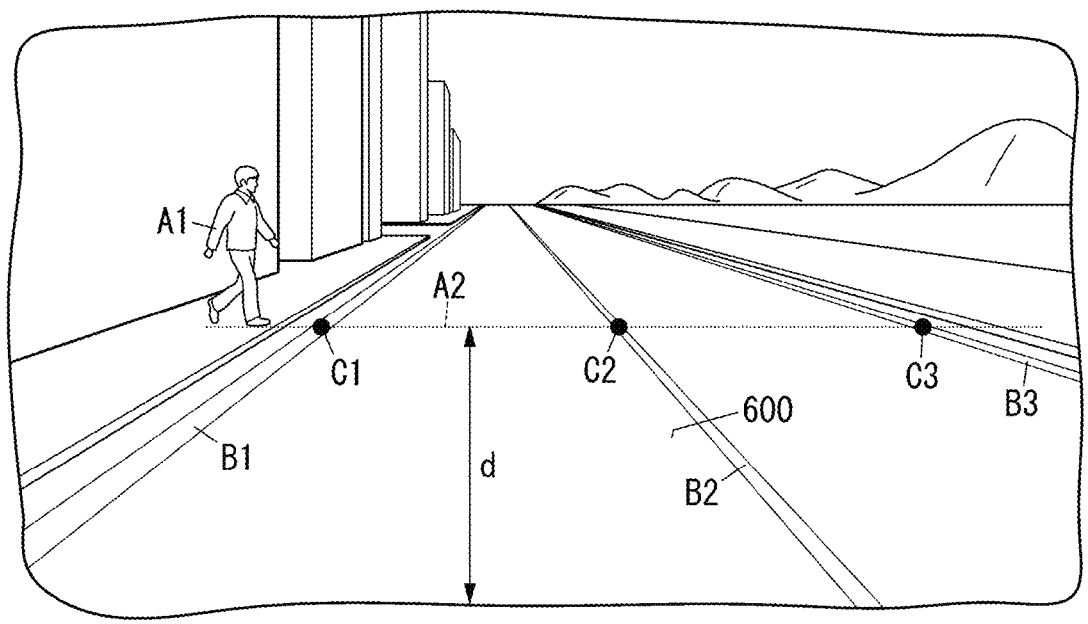
FIG. 6A is a conceptual diagram describing a specific example of operations of the display system.

(4) Specific Example of Operations of Display System and Specific Example of Display Mode As illustrated in FIG. 5A, when determining in step S1 that there exists caution object A1 (a person in this case), display controller 52 acquires distance d from vehicle 100 to caution object A1 in the projection direction of virtual image 300 in step S2. As illustrated in FIG. 5B, display controller 52 determines white lines B1 to B3 based on the driving assistance information. As illustrated in FIG. 6A, display controller 52 extracts candidate points C1 to C3 positioned at a distance equal to distance d on white lines B1 to B3 (positions where auxiliary line A2 as a virtual line crosses white lines B1 to B3). That is, display controller 52 extracts portions of the white lines as candidate points along the projection direction.

Figure 6B:
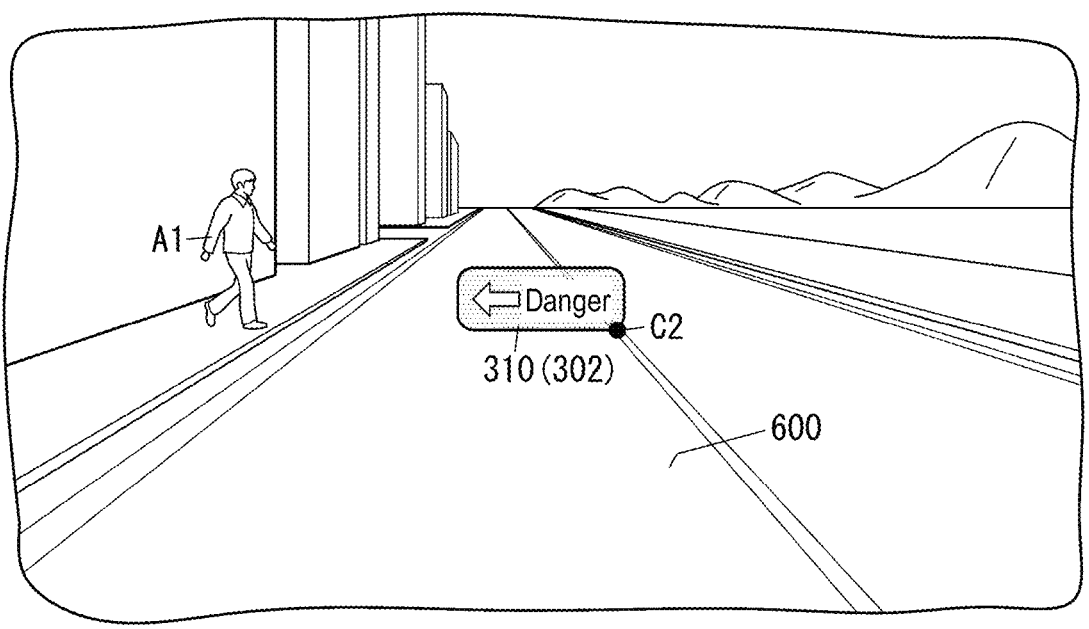
FIG. 6B is a conceptual diagram describing a specific example of operations of the display system.

As illustrated in FIG. 6B, display controller 52 selects one reference point (candidate point C2 in this case) from candidate points C1 to C3 which are extracted, and controls drive controller 51 to display virtual image 310 as second virtual image 302 with the reference point which is selected as a starting point. The contents displayed as virtual image 310 are the contents for attracting the attention of user 200. Controller 5 of display system 10 extracts a portion of the white line existing on road surface 600 as a reference point, and displays the reference point and virtual image 310 in association with each other such that virtual image 310 is displayed on auxiliary line A2 as a virtual line connecting caution object A1 and the reference point.

Figure 7A:
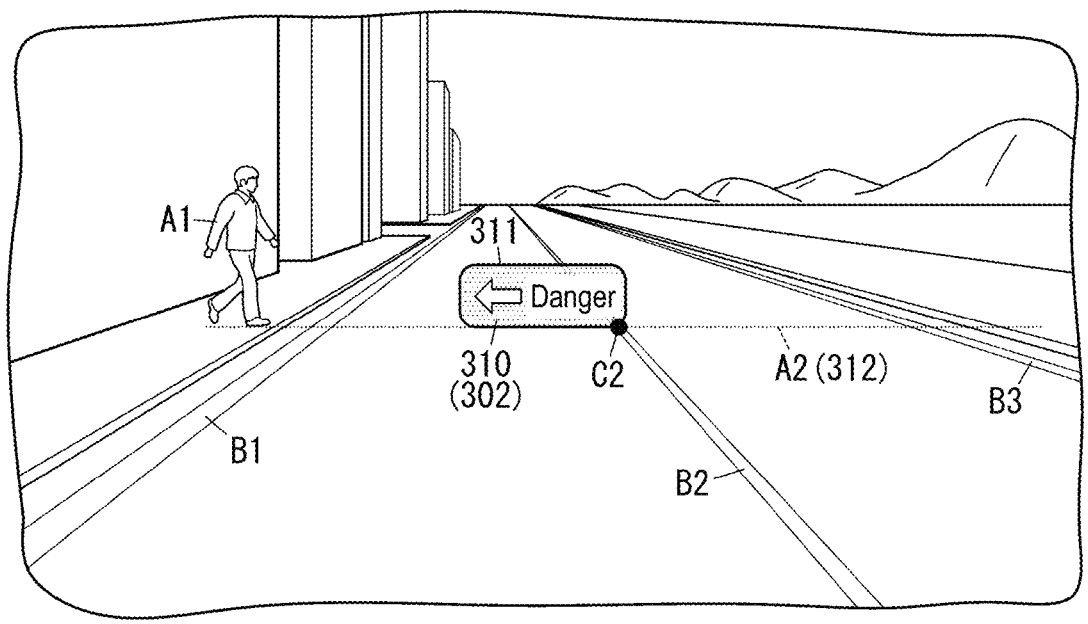
FIG. 7A is a conceptual diagram for describing a modification example of a display mode of a virtual image displayed by the display system.

In the display mode of the foregoing specific example, virtual image 310 is displayed without auxiliary line A2. However, the present disclosure is not limited to the display mode. Virtual image 310 may be displayed including virtual image 311 representing the contents corresponding to caution object A1 and virtual image 312 as auxiliary line A2 as illustrated in FIG. 7A. Displaying auxiliary line A2 as fourth virtual image 312 allows user 200 to recognize more easily that caution object A1 and virtual image 311 correspond to each other.

Figure 7B:
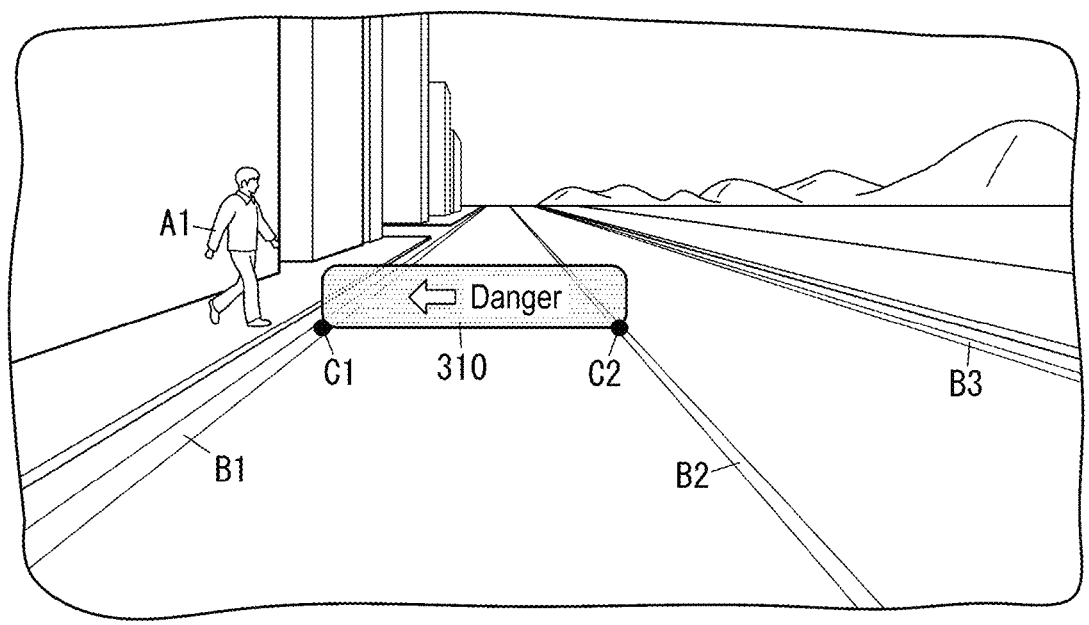
FIG. 7B is a conceptual diagram for describing a modification example of a display mode of a virtual image displayed by the display system.

Alternatively, as illustrated in FIG. 7B, controller 5 may select two reference points from a plurality of candidate points (candidate points C1 to C3) and display virtual image 310 with the two reference points which are selected (for example, candidate points C1, C2) at both ends. In this case, auxiliary line A2 may be displayed or may not be displayed as a virtual image.

Figure 8A:
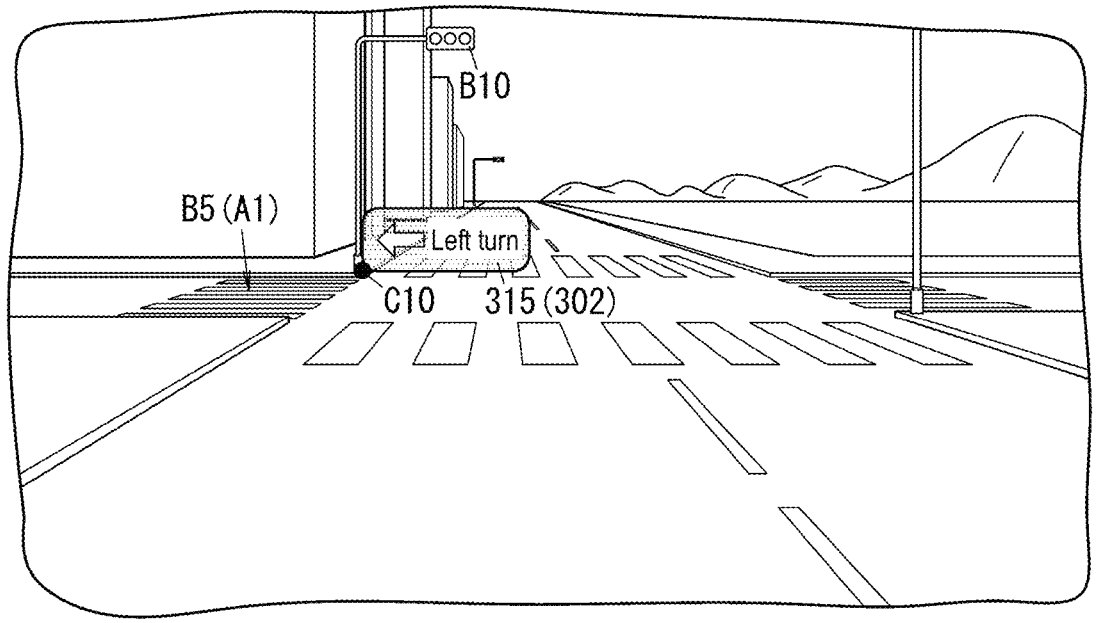
FIG. 8A is a conceptual diagram for describing a modification example of a display mode of a virtual image displayed by the display system.

Besides the white lines, for example, road signs, crosswalks, telephone poles, street lights, and signboards of fixed sizes are extracted as candidate points. The road signs of fixed sizes include traffic signals. When displaying the information on navigation to vehicle 100 (the information indicating "left turn" as an example), display controller 52 of controller 5 extracts as candidate point C10 at least the position of traffic signal B10 existing around left-turn position B5 as caution object A1 as illustrated in FIG. 8A. Display controller 52 selects traffic signal B10 from one or more candidate points including at least traffic signal B10, as a reference point (candidate point C10). Drive controller 51 displays virtual image 315 indicating a left turn as second virtual image 302 in association with the reference point.

Figure 8B:
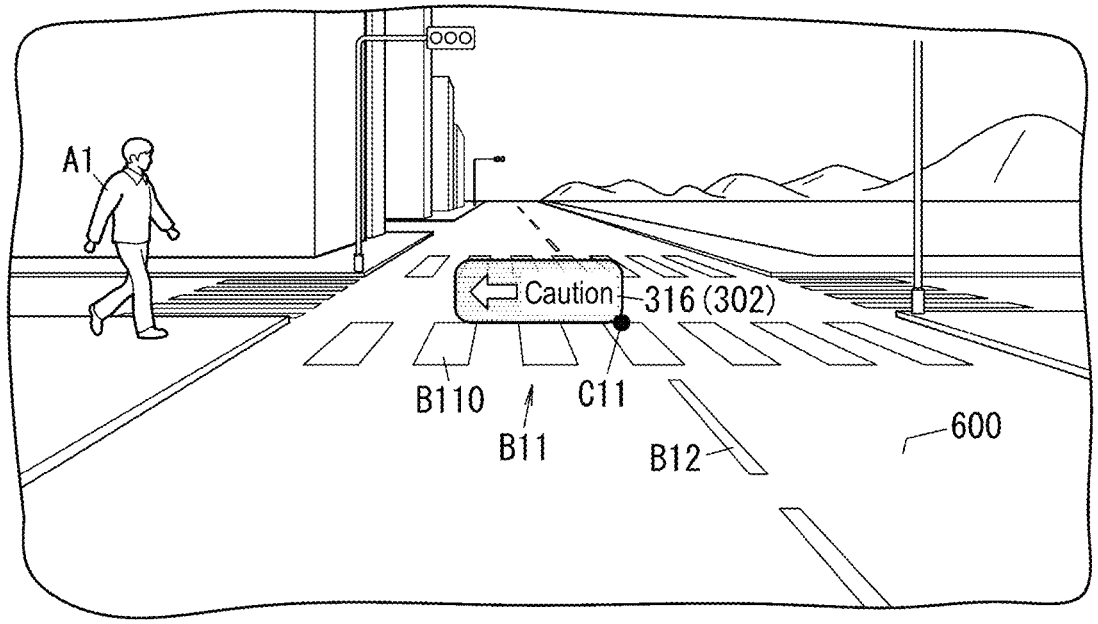
FIG. 8B is a conceptual diagram for describing a modification example of a display mode of a virtual image displayed by the display system.

In addition, as illustrated in FIG. 8B, for example, when crosswalk B11 exists around caution object A1 (a person in this case), display controller 52 extracts as candidate point C11 at least a position where crosswalk B11 including a plurality of lines B110 aligned in a lateral direction and an extension line of white line B12 along road surface 600 cross each other. Display controller 52 selects candidate point C11 as a reference point from one or more candidate points including at least the plurality of lines B110 of crosswalk B11. Drive controller 51 displays virtual image 316 for attracting the attention of the user as second virtual image 302 in association with the reference point.

Figure 9:
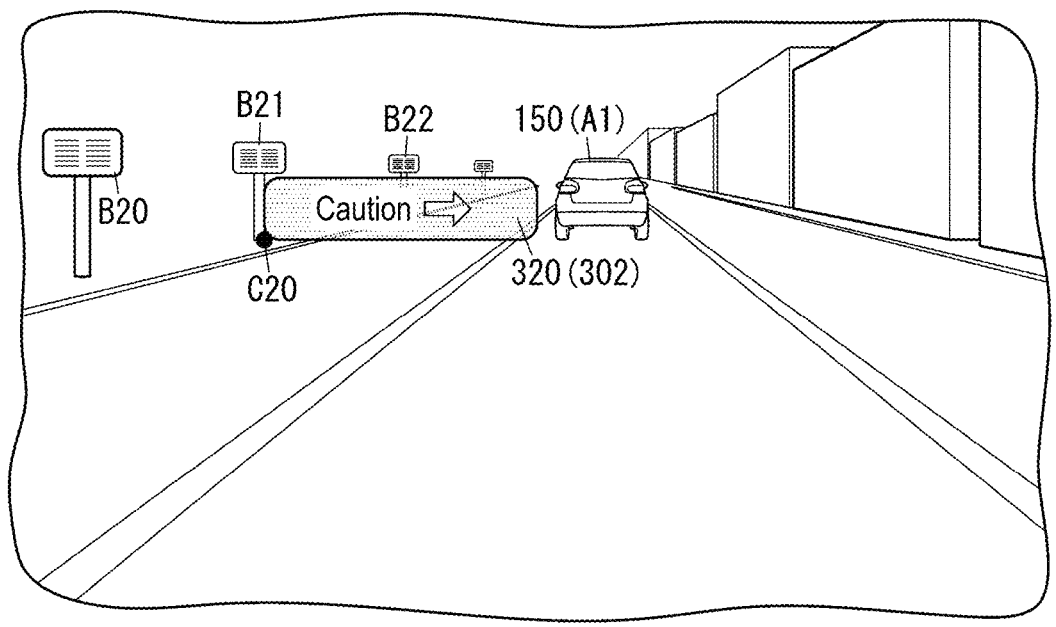
FIG. 9 is a conceptual diagram for describing a modification example of a display mode of a virtual image displayed by the display system.

As illustrated in FIG. 9, display controller 52 extracts at least a target object existing around caution object A1, as candidate point C20, out of target objects of road signs B20 to B22 aligned at predetermined intervals in the projection direction of virtual image 300. Road signs B20 to B22 are road signs that indicate the distance between caution object A1 (forward vehicle 150 in this case) and vehicle 100 (subject vehicle), for example. Display controller 52 selects candidate point C20 (road sign B21) as a reference point from one or more candidate points including at least road sign B21. Drive controller 51 displays virtual image 320 for attracting the attention of the user as second virtual image 302 in association with the reference point.

Figure 10:
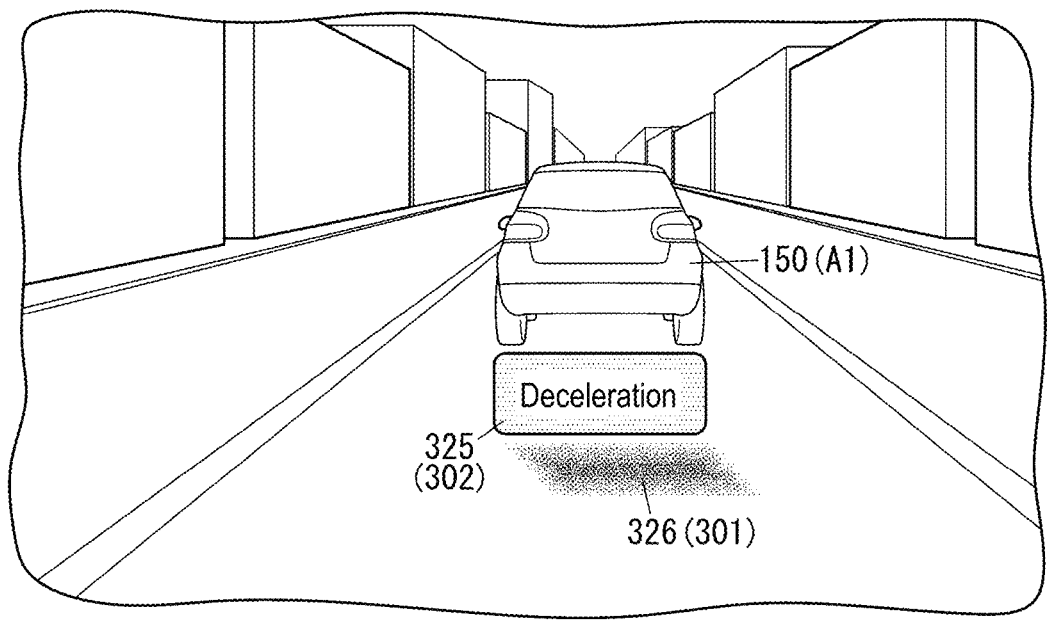
FIG. 10 is a conceptual diagram for describing a modification example of a display mode of a virtual image displayed by the display system.

As illustrated in FIG. 10, display system 10 may add a shadow to the virtual image as second virtual image 302 with the contents for attracting the attention of the user to caution object A1. For example, when forward vehicle 150 is set as caution object A1, display system 10 displays virtual image 325 (second virtual image 302) representing "deceleration" for attracting the attention of the user to the distance between vehicle 100 and vehicle 150, with vehicle 150 as a reference point. In this instance, display system 10 displays virtual image 326 (first virtual image 301) representing the shadow of virtual image 325. Virtual image 325 as second virtual image 302 has no depth along road surface 600. Accordingly, display system 10 displays virtual image 326 representing the shadow with a depth along road surface 600 to make it easy for user 200 to gain a sense of distance to the reference point.

(5) First Modification Example of Display Mode

In the foregoing specific example of the display mode, second virtual image 302 is displayed on an auxiliary line connecting the reference point and caution object A1, but the display mode is not limited to this. In the first modification example, virtual image 300 is displayed according to caution object A1 above the reference point.

Figure 11A:
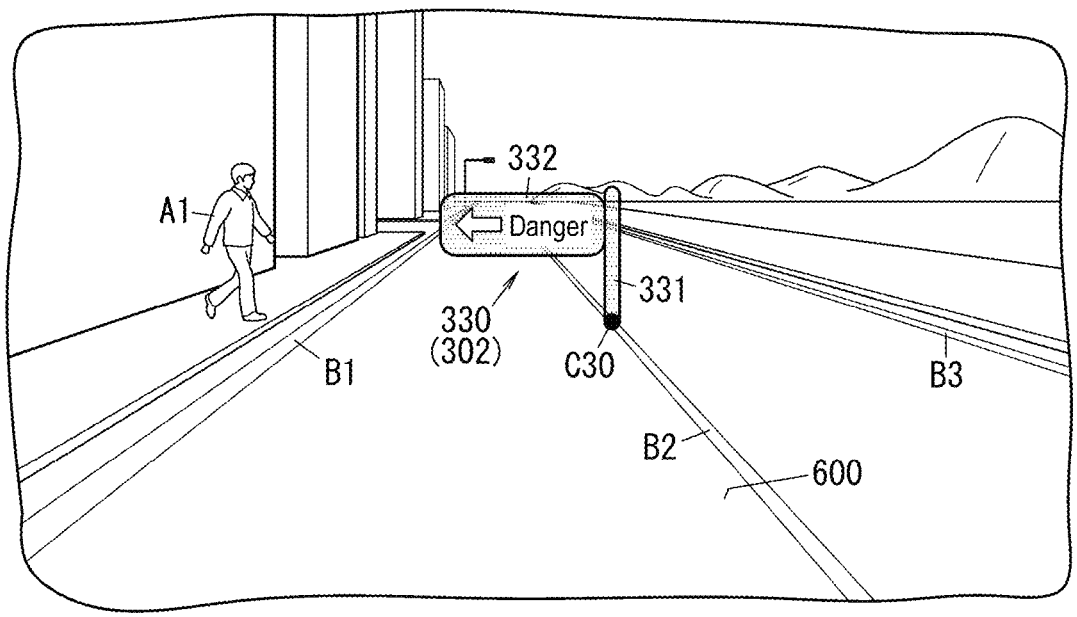
FIG. 11A is a diagram for describing a display mode of a virtual image displayed by a display system in a first modification example.

For example, as illustrated in FIG. 11A, display system 10 displays virtual image 330 including virtual image 331 and virtual image 332 as second virtual image 302. Virtual image 331 represents a pole extending away from reference point C30 at part of white line B2. Virtual image 332 represents the contents according to caution object A1 and is displayed at the leading end of virtual image 331.

Figure 11B:
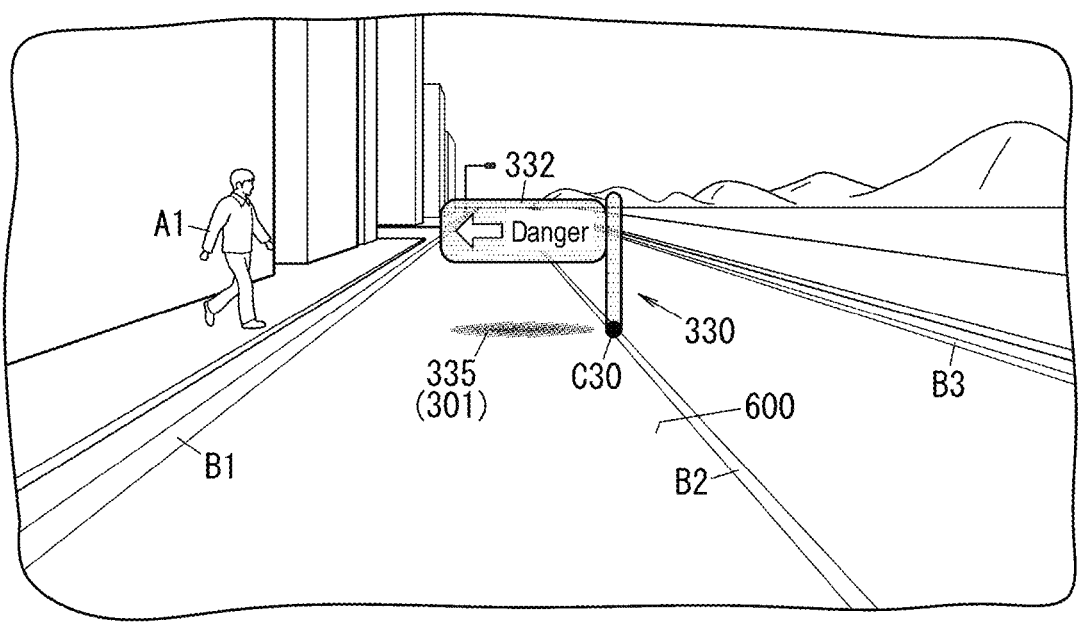
FIG. 11B is a diagram for describing a display mode of a virtual image displayed by the display system in the first modification example.

As illustrated in FIG. 11B, display system 10 may display virtual image 335 representing the shadow of virtual image 332 as first virtual image 301 so that user 200 can visually recognize that virtual image 332 is located at the leading end of reference point C30. Second virtual image 302 has no depth along road surface 600. Accordingly, display system 10 displays virtual image 335 representing the shadow with a depth along road surface 600 to make it easy for user 200 to gain a sense of distance to reference point C30.

(6) Second Modification Example of Display Mode

In the second modification example, display system 10 changes the display mode of virtual image 300 according to the distance to caution object A1.

Figure 12A:
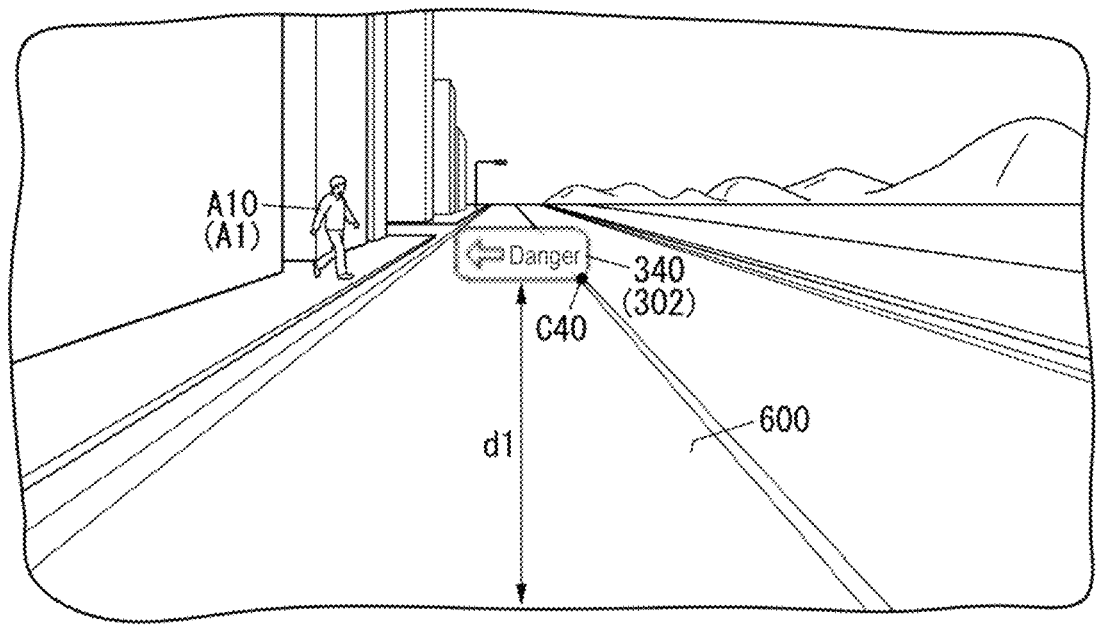
FIG. 12A is a conceptual diagram for describing a display mode of a virtual image displayed by a display system in a second modification example.
Figure 12B:
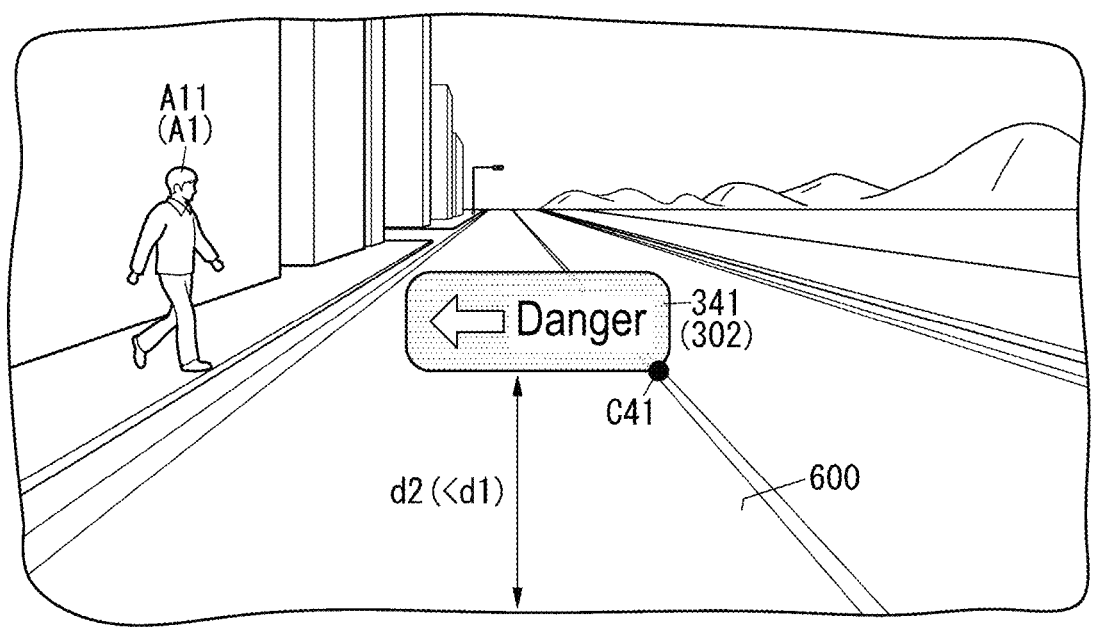
FIG. 12B is a conceptual diagram for describing a display mode of a virtual image displayed by the display system in the second modification example.

In the second modification example, as illustrated in FIGS. 12A and 12B, it is assumed that person A10, person A11 exist as caution objects A1 on road surface 600. Caution object A10 illustrated in FIG. 12A and caution object A11 illustrated in FIG. 12B are different in distance from vehicle 100 to caution object A1 in the projection direction of virtual image 300. Distance d1 from vehicle 100 to caution object A10 is longer than distance d2 from vehicle 100 to caution object A11. That is, caution object A10 exists at a long distance, and caution object A11 exists at a short distance.

As illustrated in FIG. 12A, when caution object A10 is located at a long distance, controller 5 displays virtual image 340 as second virtual image 302 representing the contents for attracting the attention of the user with reference point C40 at part of a white line as a starting point. In this instance, controller 5 reduces the display area of virtual image 340 and blurs the color of the display area and characters in the display area by filtering or the like. On the other hand, as illustrated in FIG. 12B, when caution object A1 (A11) is located at a short distance, controller 5 displays virtual image 341 as second virtual image 302 representing the contents for attracting the attention of the user with reference point C41 at part of the white line as a starting point. In this instance, controller 5 increases the display area of virtual image 341 as compared to virtual image 340 and clearly displays the characters in the display area.

Display system 10 may change the color of the display area between the case where caution object A1 is located at a short distance and the case where caution object A1 is located at a long distance. For example, when caution object A1 is located at a short distance, display system 10 sets the color of the display area to red (the color expressing danger), and when caution object A1 is located at a long distance, display system 10 sets the color of the display area to yellow (the color expressing caution).

At nighttime, vehicle 100 emits light from the headlights. Accordingly, there may be an overlap between the area irradiated with light from the headlights and virtual image 300.

Figure 13A:
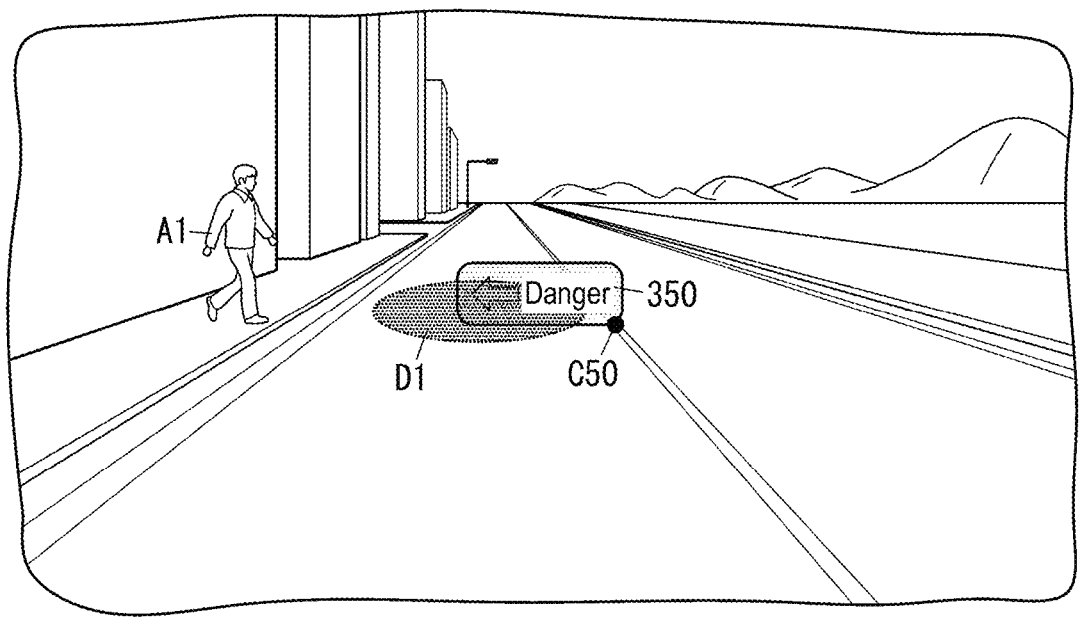
FIG. 13A is a conceptual diagram for describing another display mode of a virtual image displayed by the display system in the second modification example.

For example, as illustrated in FIG. 13A, at nighttime, display system 10 displays virtual image 350 as second virtual image 302 representing the contents according to caution object A1 (a person in this case) with reference point C50 at part of the white line as a starting point. In this instance, area D1 irradiated with light from the headlights and virtual image 350 overlap each other to make virtual image 350 hard to see. Accordingly, user 200 may not visually recognize virtual image 350.

Figure 13B:
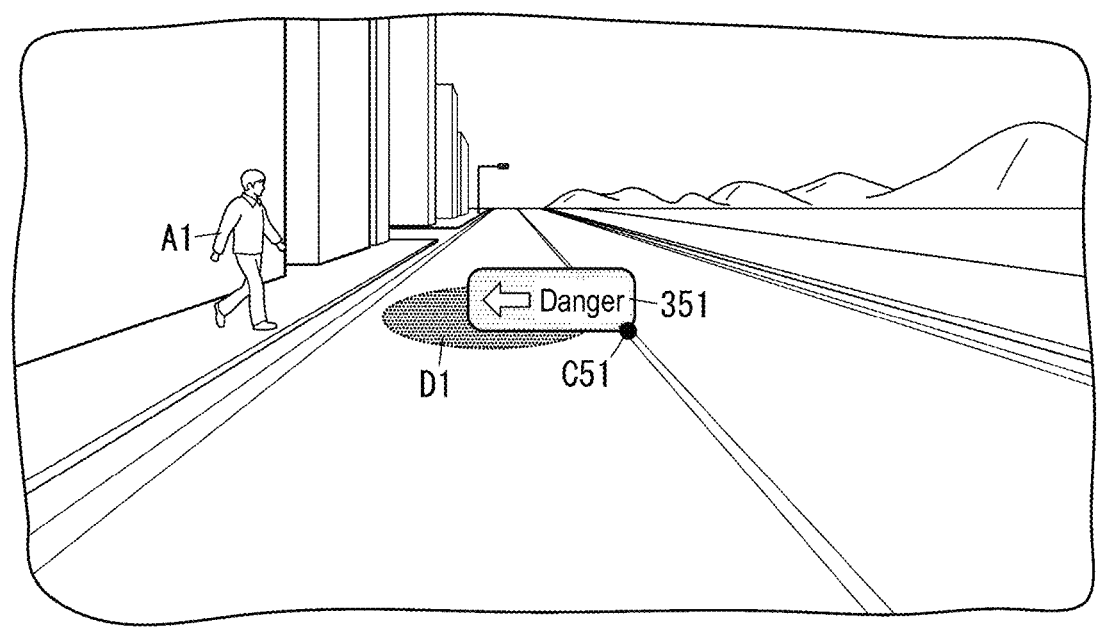
FIG. 13B is a conceptual diagram for describing another display mode of a virtual image displayed by the display system in the second modification example.

As illustrated in FIG. 13B, when displaying virtual image 351 (second virtual image 302) according to caution object A1 with reference point C51 at part of the white line as a starting point, if area D1 irradiated with light from the headlights and virtual image 351 overlap each other, display system 10 of the second modification example increases the brightness of virtual image 351 (see FIG. 13B). This makes virtual image 351 easy to see even when area D1 and virtual image 351 overlap each other.

(7) Third Modification Example of Display Mode

Figure 14A:
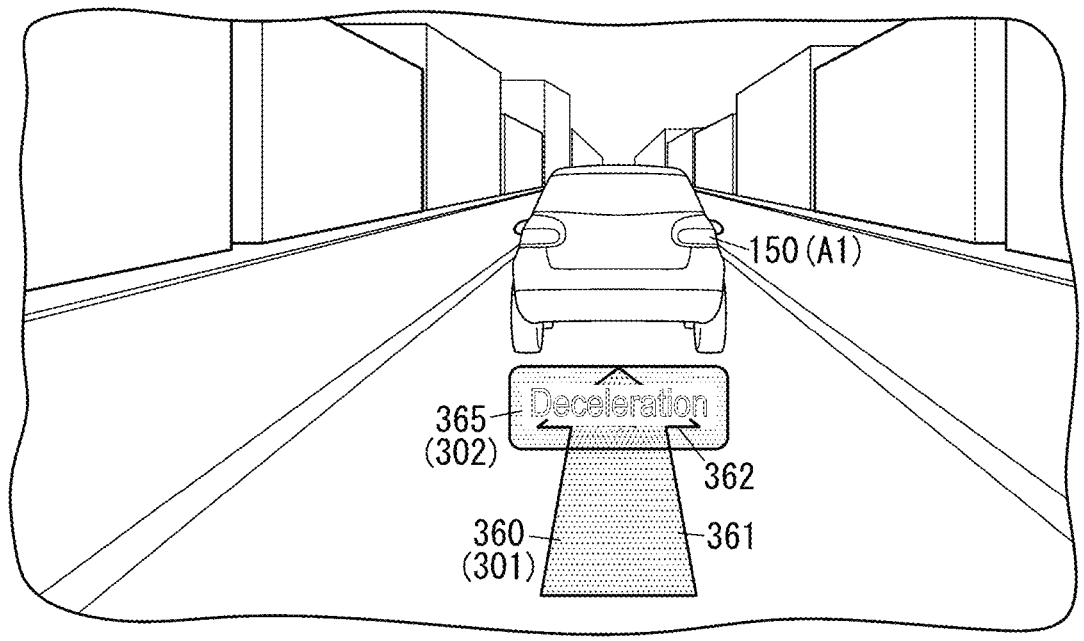
FIG. 14A is a conceptual diagram for describing a display mode of a virtual image displayed by a display system in a third modification example.

Display system 10 can display the running direction of vehicle 100 (straight-forward direction, right-turn direction, and left-turn direction) as first virtual image 301 based on the navigation information. Accordingly, when second virtual image 302 representing the contents according to a caution object is displayed, second virtual image 302 may overlap first virtual image 301 based on the navigation information. For example, as illustrated in FIG. 14A, it is assumed that straight-forward arrow 360 is displayed as first virtual image 301. In this case, when virtual image 365 for attracting the attention of the user to the distance to vehicle 150 as caution object A1 (prompting the user to lower the vehicle speed) is displayed with part of the area in front of vehicle 150 as a reference point, there is an overlap between leading end portion 362 of straight-forward arrow 360 and virtual image 365. Accordingly, the contents of virtual image 365 may be hard to see.

Figure 14B:
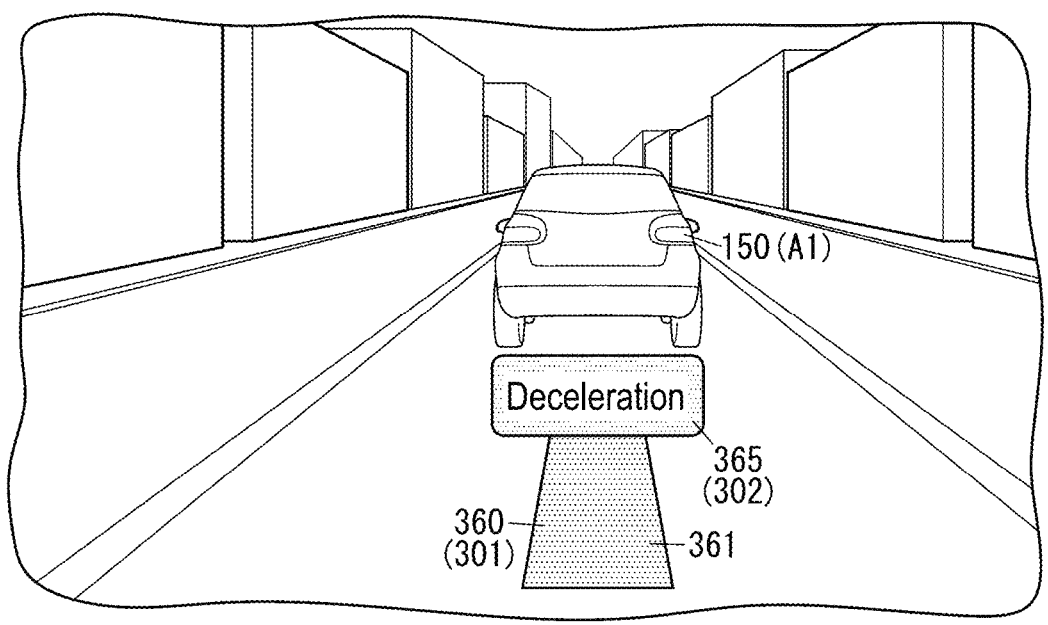
FIG. 14B is a conceptual diagram for describing a display mode of a virtual image displayed by the display system in the third modification example.

Thus, display system 10 does not display the portion of first virtual image 301 overlapping second virtual image 302 (leading end portion 362) but displays non-overlapping portion 361 as illustrated in FIG. 14B. This makes virtual image 365 as second virtual image 302 easy to see.

(8) Fourth Modification Example of Display Mode

Display system 10 can display first virtual image 301 and second virtual image 302 as described above. When road surface 600 looks bright due to snow or the like, virtual image 300 which is displayed as first virtual image 301 or second virtual image 302 becomes hard to see.

Thus, display system 10 of the fourth modification example changes the display mode of virtual image 300 according to the brightness of road surface 600.

Display system 10 determines the brightness of road surface 600 based on an image obtained from detection system 7.

Figure 15A:
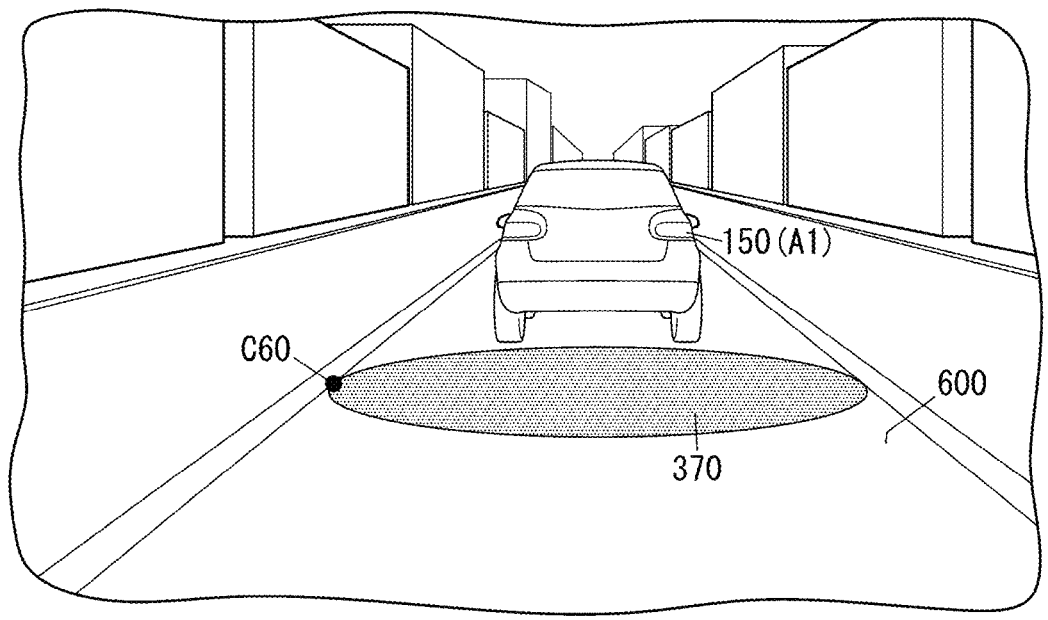
FIG. 15A is a conceptual diagram for describing a display mode of a virtual image displayed by a display system in a fourth modification example.

As illustrated in FIG. 15A, when the brightness of road surface 600 is equal to or less than a predetermined value, display system 10 displays virtual image 370 as first virtual image 301 or second virtual image 302 behind vehicle 150 as caution object A1 with reference point C60 at part of a white line as a starting point.

Figure 15B:
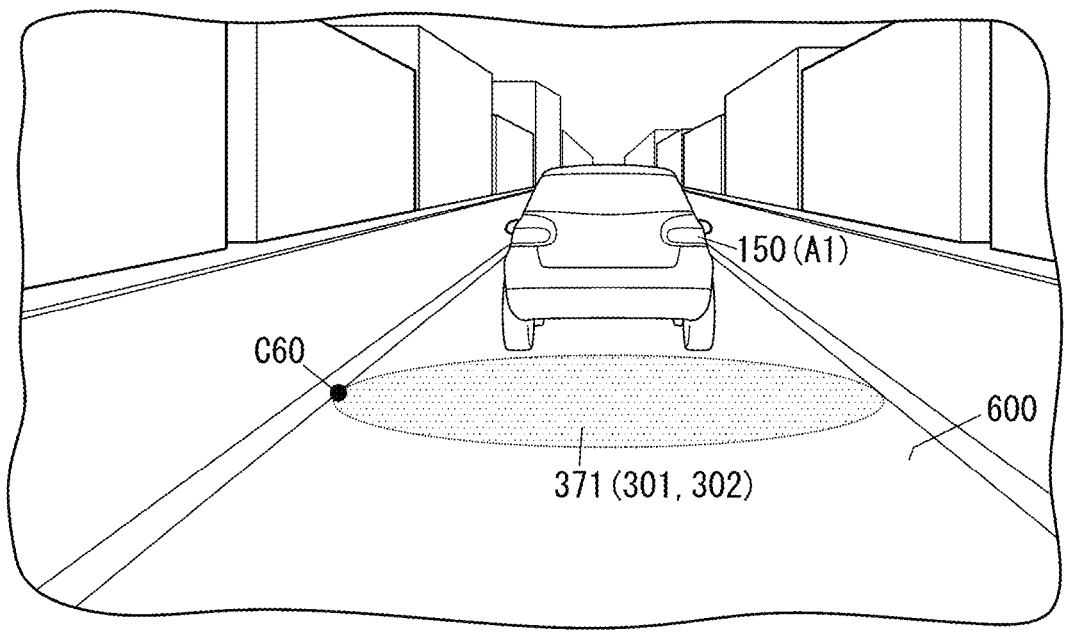
FIG. 15B is a conceptual diagram for describing a display mode of a virtual image displayed by the display system in the fourth modification example.

Display system 10 can display first virtual image 301 and second virtual image 302 at the same time as described above. As illustrated in FIG. 15B, when road surface 600 looks bright, that is, the brightness of road surface 600 exceeds a predetermined value, display system 10 displays first virtual image 301 and second virtual image 302 as virtual image 371 with the same contents and at the same position with reference point C60 as a starting point. Displaying first virtual image 301 and second virtual image 302 as virtual image 371 with the same contents and at the same position increases the brightness of the displayed portion to make virtual image 371 easy to see (visually recognize). Although virtual images 370, 371 are displayed in oval form in FIGS. 15A and 15B, some characters or shapes according to the caution object are actually displayed.

(9) Fifth Modification Example of Display Mode

Controller 5 can control movement of movable screen 1a to display second virtual image 302 such that the display position of second virtual image 302 changes (for example, the display position changes from the front to back along road surface 600). That is, controller 5 can display second virtual image 302 like animation.

Descriptions will be given as to an example of a case where display system 10 displays second virtual image 302 representing a frame surrounding forward vehicle 150 as caution object A1 with part of vehicle 150 as caution object A1 as a reference point. The display contents of second virtual image 302 may include characters, symbols, and others.

Figure 16A:
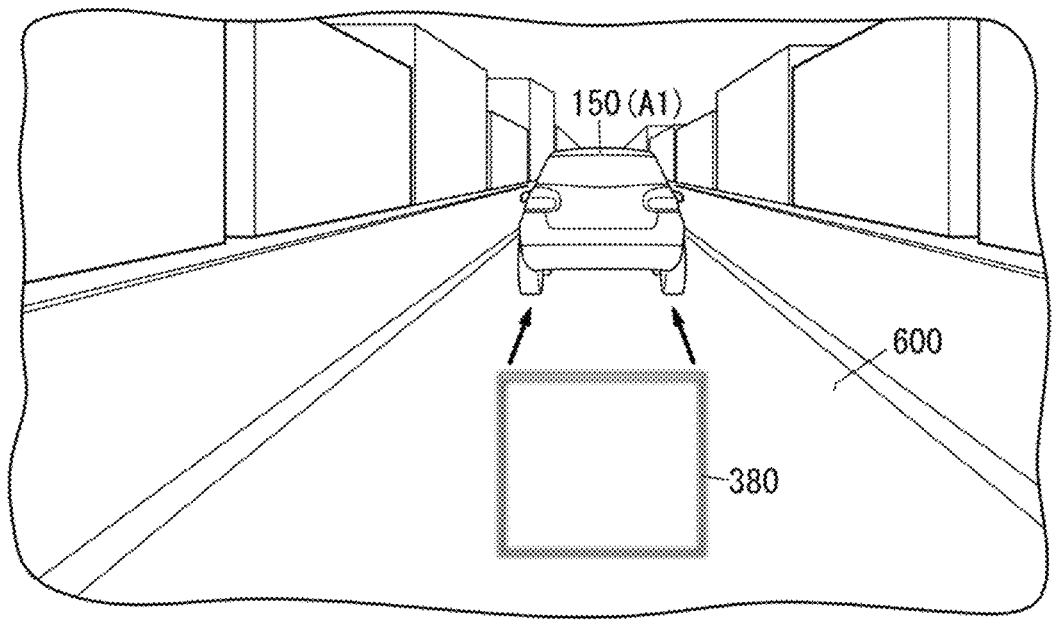
FIG. 16A is a conceptual diagram for describing a display mode of a virtual image displayed by a display system in a fifth modification example.

First, display system 10 displays virtual image 380 representing a frame as second virtual image 302 on this side of vehicle 150 as illustrated in FIG. 16A. In this instance, display system 10 blurs virtual image 380 by filtering or the like.

After that, display system 10 displays virtual image 380 while moving virtual image 380 along road surface 600 to come closer to vehicle 150 under control of controller 5. In this instance, display system 10 moves virtual image 380 while lowering the degree of blurriness.

Figure 16B:
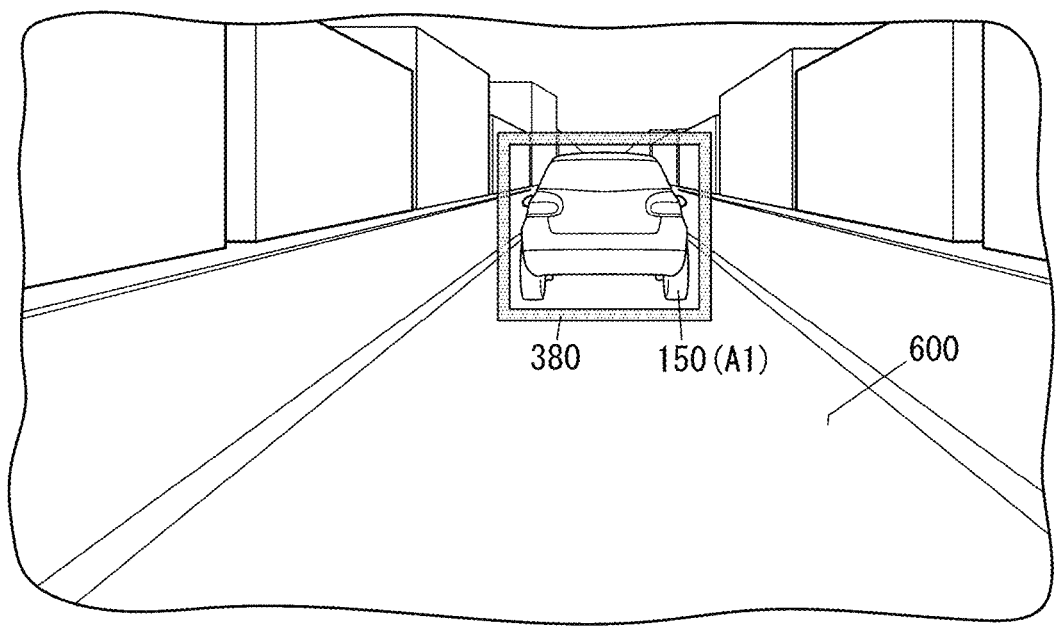
FIG. 16B is a conceptual diagram for describing a display mode of a virtual image displayed by the display system in the fifth modification example.

By further movement of virtual image 380, display system 10 displays virtual image 380 to surround vehicle 150 by the frame represented by virtual image 380 as illustrated in FIG. 16B. In this instance, display system 10 does not perform a filtering process on the frame represented by virtual image 380 surrounding vehicle 150.

According to the foregoing operations, display system 10 can move virtual image 380 to focus on vehicle 150 like putting a camera focus on a subject. This allows user 200 to grasp the distance to the target object (vehicle 150) of virtual image 380.

(Other Modifications)

The foregoing exemplary embodiment is merely one of various embodiments of the present disclosure. The foregoing exemplary embodiment can be modified in various manners according to designs and the like as long as the object of the present disclosure can be attained. The same functions as those of display system 10 may be embodied by an identification method, a computer program, or a recording medium storing a program. A control method of display system 10 according to another aspect is a control method including projector 40 that projects virtual image 300 onto target space 400 to allow a target person (for example, user 200) to visually recognize virtual image 300, and controller 5 that controls display of virtual image 300. In the control method of display system 10, when projector 40 projects virtual image 300 according to a caution object, a reference point is selected from one or more candidate points existing around the caution object and virtual image 300 is associated with the reference point. A program according to still another aspect is a program for causing a computer system to execute the control method of display system 10.

Display system 10 or the entity executing the control method of display system 10 in the present disclosure includes a computer system. The computer system mainly includes a processor and a memory as hardware. When the processor executes a program recorded in the memory of the computer system, the functions of the system or the entity executing the method in the present disclosure are implemented. The program may be recorded in advance in the memory of the computer system or may be provided through a telecommunication line. The program may be recorded and provided in a non-transitory recording medium capable of being read by the computer system, such as a memory card, an optical disc, or a hard disc drive. The processor in the computer system is composed of one or more electronic circuits including a semiconductor integrated circuit (IC) or a large-scale integrated circuit (LSI). The plurality of electronic circuits may be aggregated in one chip or dispersed in a plurality of chips. The plurality of chips may be aggregated in one device or dispersed in a plurality of devices.

The functions of controller 5 in display system 10 may be dispersed in a plurality of systems (devices). At least some of the functions of controller 5 may be implemented by cloud computing, for example.

Display system 10 may use a vehicle-to-everything (V2X) communication technology for direct communications between vehicles (vehicle to vehicle) or between vehicle and infrastructure such as traffic signals and road signs (road to vehicle). According to the V2X communication technology, for example, vehicle 100 can acquire mobile body information from surrounding vehicles or infrastructure. The contents of virtual image 300 to be projected onto target space 400 may be determined by infrastructure. In this case, vehicle 100 may not have at least part of controller 5.

Display system 10 may not be necessarily configured to project virtual image 300 onto target space 400 set ahead of vehicle 100 as seen in the traveling direction. For example, display system 10 may project virtual image 300 onto the space on the lateral, rear, or upper side of vehicle 100 as seen in the traveling direction, for example.

Display system 10 may not be necessarily a head-up display for use in vehicle 100. For example, display system 10 is also applicable to mobile bodies other than vehicle 100 such as two-wheel vehicles, trains, aircrafts, construction machinery, and ships. The use of display system 10 is not limited to mobile bodies. For example, display system 10 may be used in amusement facilities or may be used as wearable terminals such as head mounted displays (HMD), medical equipment, or stationary devices.

Display system 10 may not be necessarily configured to project a virtual image using laser light. For example, display system 10 may be configured to project an image (virtual image 300) onto a diffuse transmission screen 1 by a projector from behind screen 1. Alternatively, display system 10 may project virtual image 300 according to an image displayed in a liquid crystal display via projector 40.

In the foregoing exemplary embodiment and modification examples, virtual image 300 according to caution object A1 is second virtual image 302. Alternatively, virtual image 300 according to caution object A1 may be first virtual image 301.

In the foregoing exemplary embodiment and modification examples, detection system 7 includes imaging device 71 and laser radar 72 but is not limited to this configuration. Detection system 7 only needs to have a function of detecting the presence or absence of caution object A1 in the projection direction of virtual image 300.

In the foregoing exemplary embodiment and modification examples, detection system 7 is configured to determine the distance to caution object A1 but is not limited to this configuration. Controller 5 of display system 10 may determine the distance to caution object A1.

(Summary)

Display system (10) of a first aspect includes projector (40) and controller (5). Projector (40) projects virtual image (300) onto target space (400). Controller (5) controls display of virtual image (300). When projector (40) projects virtual image (300) according to caution object (A1), controller (5) selects a reference point from one or more candidate points existing around caution object (A1) and associates virtual image (300) with the reference point. In this case, caution object (A1) is a person, vehicle 150, or the like, for example.

According to this configuration, virtual image (300) is displayed in association with the reference point existing around caution object (A1), which makes it easy for user (200) to recognize which caution object (A1) corresponds to virtual image (300) which is displayed.

In display system (10) of a second aspect, in the first aspect, controller (5) extracts candidate points using a captured image. According to this configuration, display system (10) can extract candidate points from an image.

In display system (10) of a third aspect, in the first or second aspect, controller (5) extracts at least a road sign of a prefixed size (for example, traffic signal B10) as a candidate point, and selects the road sign as a reference point. According to this configuration, display system (10) selects a sign of a prefixed size as a reference point, which makes it easy for user (200) to grasp the distance to the sign. Accordingly, user (200) can also easily grasp the distance to caution object (A1).

In display system (10) of a fourth aspect, in the first or second aspect, out of a plurality of target objects (for example, road signs B20 to B22) aligned at predetermined intervals in the projection direction of virtual image (300), controller (5) extracts at least a target object existing around caution object (A1) as a candidate point, and selects the target object existing around caution object (A1) as a reference point. According to this configuration, out of a plurality of target objects aligned at predetermined intervals, a target object existing around caution object (A1) is selected as a reference point, which makes it easy for user (200) to grasp the distance to the sign. Accordingly, user (200) can also easily grasp the distance to caution object (A1).

In display system (10) of a fifth aspect, in the first or second aspect, controller (5) extracts portions of a plurality of white lines (B1 to B3) existing on road surface (600) as candidate points, and selects one of the plurality of candidate points which are extracted as a reference point. According to this configuration, the reference point is set on road surface (600), which makes it easy for user (200) to grasp the distance to the road sign.

In display system (10) of a sixth aspect, in the first or second aspect, controller (5) extracts portions of a plurality of white lines (B1 to B3) existing on road surface (600) as candidate points, and selects one of the plurality of candidate points which are extracted as a reference point. Controller (5) associates the reference point with virtual image (300) such that virtual image 300 is displayed on a virtual line (for example, auxiliary line A2) connecting caution object (A1) and the reference point. According to this configuration, virtual image (300) is displayed on the virtual line connecting caution object (A1) and the reference point, which makes it easy for user (200) to recognize which caution object (A1) corresponds to virtual image (300) which is displayed.

In display system (10) of a seventh aspect, in the first or second aspect, controller (5) extracts portions of a plurality of white lines (B1 to B3) existing on road surface (600) as candidate points, and selects two of the plurality of candidate points which are extracted as reference points. Controller (5) associates one end of virtual image (300) with one of the two reference points and associates the other end of virtual image (300) with the other reference point. According to this configuration, the reference points are set on road surface 600 to makes it easy for user (200) to grasp the distance to the road sign.

In display system (10) of an eighth aspect, in any one of the first to seventh aspects, controller (5) changes the display mode of virtual image (300) according to the distance to caution object (A1). According to this configuration, the display mode of virtual image (300) is changed according to the distance to caution object (A1), which makes it easy for user (200) to grasp the distance to caution object (A1).

In display system (10) of a ninth aspect, in any one of the first to eighth aspects, controller (5) determines the distance to caution object (A1) in the projection direction of virtual image (300) and selects a reference point from one or more candidate points existing at the distance. According to this configuration, the reference point is selected according to the distance to caution object (A1) in the projection direction of virtual image (300), which makes it easy for user (200) to grasp the distance to caution object (A1).

An information presentation system (1000) of a tenth aspect includes detection system (7) that detects caution object (A1) and display system (10) in any one of the first to ninth aspects. According to this configuration, virtual image (300) is displayed in association with the reference point existing around caution object (A1), which makes it easy for user (200) to recognize which caution object (A1) corresponds to virtual image (300) which is displayed.

A control method of display system (10) in an eleventh aspect is a control method of display system (10) including projector (40) that projects virtual image (300) onto target space (400) to allow a target person (for example, user 200) to visually recognize virtual image (300), and controller (5) that controls display of virtual image (300). In the control method of display system (10), when projector (40) projects virtual image (300) according to caution object (A1), a reference point is selected from one or more candidate points existing around caution object (A1) and virtual image (300) is associated with the reference point. According to this control method, virtual image (300) is displayed in association with the reference point existing around caution object (A1), which makes it easy for user (200) to recognize which caution object (A1) corresponds to virtual image (300) which is displayed.

A program of a twelfth aspect is a program for causing a computer to execute the control method of display system (10) in the eleventh aspect. According to this program, virtual image (300) is displayed in association with the reference point existing around caution object (A1), which makes it easy for user (200) to recognize which caution object (A1) corresponds to virtual image (300) which is displayed.

A mobile body (for example, vehicle 100) of a thirteenth aspect includes display system (10) in any one of the first to ninth aspects and a reflection member (for example, windshield 101). The reflection member has light permeability and reflects light emitted from projector (40) to allow a target person (for example, user 200) to visually recognize virtual image (300). According to this configuration, virtual image (300) is displayed in association with the reference point existing around caution object (A1), which makes it easy for user (200) to recognize which caution object (A1) corresponds to virtual image (300) which is displayed.

The invention claimed is:

1. A display system that projects a projected image onto a reflection member and displays the projected image reflected by the reflection member as a virtual image on a target space in front to allow a user that drives a vehicle to visually recognize the virtual image, the display system comprising:
 a projector that projects the projected image;
 a processor; and
 a memory including a program that, when executed, causes the processor to perform operations including:
  acquiring a captured image which includes a caution object and a distance from the vehicle to the caution object;
  extracting a plurality of candidate points existing around the caution object in the captured image according to the distance from the vehicle to the caution object;
  selecting at least one reference point from the plurality of candidate points existing around the caution object; and
  projecting the projected image so that the virtual image is displayed at the at least one reference point,
 wherein, in the target space in the front, portions of a plurality of white lines existing on a road surface are extracted as the plurality of candidate points, and one of the plurality of candidate points is selected as the at least one reference point, and the projected image is projected such that the virtual image is visually recognized on a virtual line connecting the caution object and the at least one reference point.

2. The display system according to claim 1, wherein the at least one reference point is two reference points, and
 wherein, two of the plurality of candidate points are selected as the at least one reference point, and the projected image is projected such that a first end of the virtual image is associated with a first one of the two reference points and a second end of the virtual image opposite to the first end of the virtual image is associated with a second one of the two reference points.

3. The display system according to claim 1, wherein a mode of the display of the projected image is changed according to the distance from the vehicle to the caution object.

4. The display system according to claim 1, wherein the at least one reference point, which exists around the caution object in the captured image, corresponds to a position of a physical object in the captured image.

5. The display system according to claim 4, wherein a vertical distance from the vehicle to the position of the physical object is same as a vertical distance from the vehicle to the caution object.

6. The display system according to claim 1, wherein each of the plurality of candidate points corresponds to a position of a physical object in the captured image.

7. An information presentation system comprising:
 the display system according to claim 1; and
 a detection system that detects the caution object.

8. A vehicle, comprising:
 the display system according to claim 1; and
 the reflection member that has light permeability and reflects light emitted from the projector to allow the user to visually recognize the virtual image.

9. A control method of a display system, the display system including a projector that projects a projected image onto a reflection member, displaying the projected image reflected by the reflection member as a virtual image on a target space in front to allow a user that drives a vehicle to visually recognize the virtual image, and further including a processor that controls display of the projected image, the control method comprising:
 acquiring a captured image which includes a caution object and a distance from the vehicle to the caution object;
 extracting a plurality of candidate points existing around the caution object in the captured image according to the distance from the vehicle to the caution object;
 selecting at least one reference point from the plurality of candidate points existing around the caution object; and
 projecting the projected image so that the virtual image is displayed at the at least one reference point, wherein, in the target space in the front, portions of a plurality of white lines existing on a road surface are extracted as the plurality of candidate points, and one of the plurality of candidate points is selected as the at least one reference point, and the projected image is projected such that the virtual image is visually recognized on a virtual line connecting the caution object and the at least one reference point.

10. A non-transitory recording medium storing a program for causing a computer to execute the control method according to claim 9.

11. A display system that projects a projected image onto a reflection member and displays the projected image reflected by the reflection member as a virtual image on a target space in front to allow a user that drives a vehicle to visually recognize the virtual image, the display system comprising:
a projector that projects the projected image;
a processor; and
a memory including a program that, when executed, causes the processor to perform operations including:
acquiring a captured image which includes a caution object and a distance from the vehicle to the caution object;
extracting a plurality of candidate points existing around the caution object in the captured image according to the distance from the vehicle to the caution object;
selecting at least one reference point from the plurality of candidate points existing around the caution object; and
projecting the projected image so that the virtual image is displayed at the at least one reference point,
wherein each of the plurality of candidate points corresponds to a position of a physical object in the captured image, and
the plurality of candidate points each exist on a virtual line connecting the caution object and the plurality of candidate points.

12. The display system according to claim 11, wherein a vertical distance from the vehicle to the position of the physical object corresponding to each of the plurality of candidate points is same as a vertical distance from the vehicle to the caution object.

13. The display system according to claim 11, wherein the at least one reference point corresponds to the position of the physical object of at least one of the plurality of candidate points in the captured image.

14. A display system that projects a projected image onto a reflection member and superimposes the projected image reflected by the reflection member as a virtual image on a target space in front to allow a target person to visually recognize the virtual image, the display system comprising:
a projector that projects the projected image; and
a processor that controls display of the projected image, wherein,
when the projector projects the projected image corresponding to a caution object, the processor selects at least one reference point from one or more candidate points existing around the caution object and associates the virtual image with the at least one reference point,
the one or more candidate points are a plurality of candidate points,
in the target space in the front, the processor extracts portions of a plurality of white lines existing on a road surface as the plurality of candidate points, and selects one of the plurality of candidate points as the at least one reference point, and
when the projector projects the projected image, the processor associates the at least one reference point with the virtual image such that the virtual image is visually recognized on a virtual line connecting the caution object and the at least one reference point.

* * * * *